Oct. 12, 1954        D. M. LONTZ        2,691,448

AUTOMATIC MATERIALS HANDLING SYSTEM

Filed July 20, 1949        8 Sheets-Sheet 1

INVENTOR
DUDLEY M. LONTZ
By
Toulmin & Toulmin
ATTORNEYS

Oct. 12, 1954  D. M. LONTZ  2,691,448
AUTOMATIC MATERIALS HANDLING SYSTEM
Filed July 20, 1949  8 Sheets-Sheet 2

INVENTOR
DUDLEY M. LONTZ
By Toulmin & Toulmin
ATTORNEYS

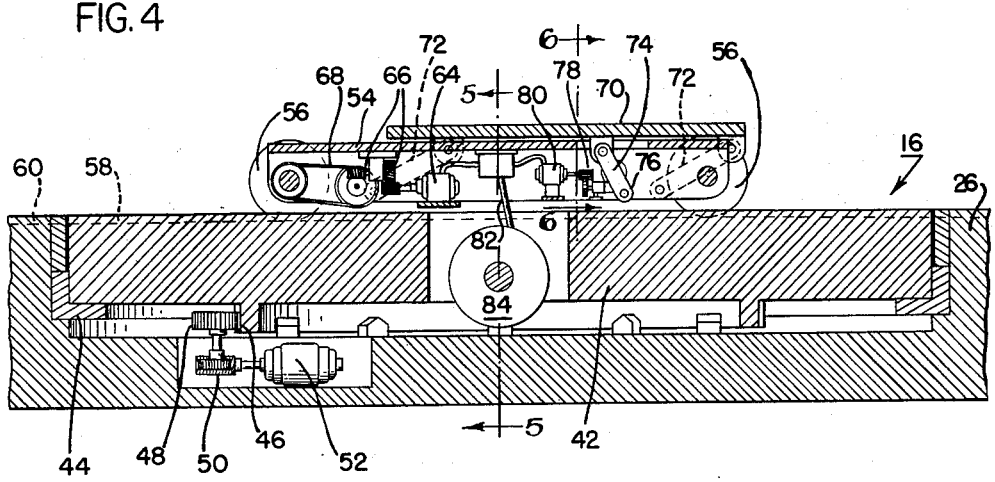
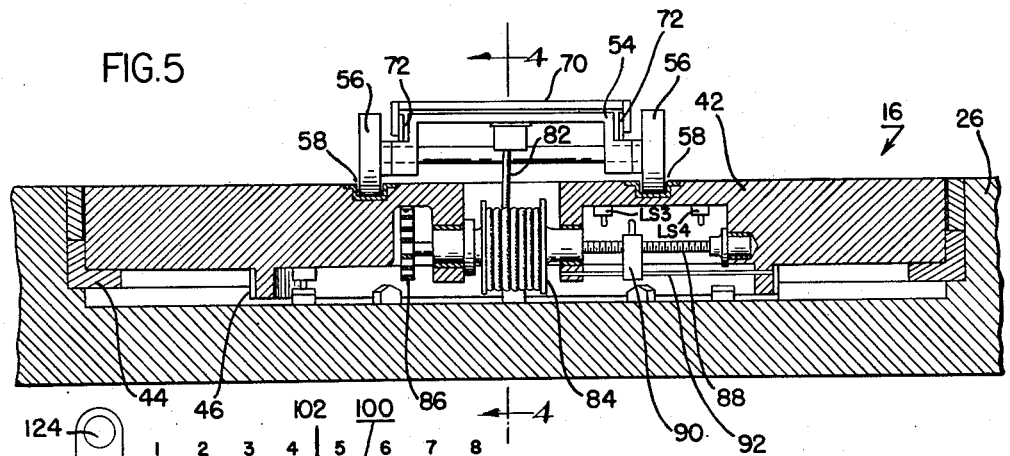
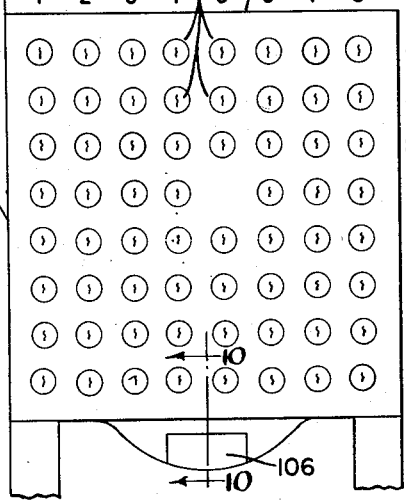

Oct. 12, 1954  D. M. LONTZ  2,691,448
AUTOMATIC MATERIALS HANDLING SYSTEM
Filed July 20, 1949  8 Sheets-Sheet 4
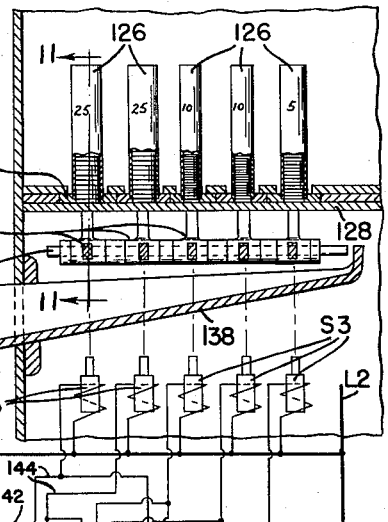
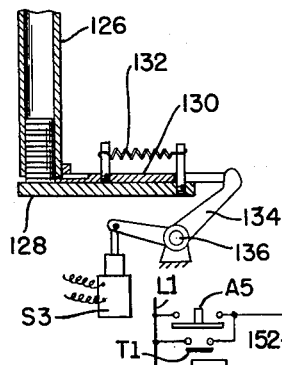
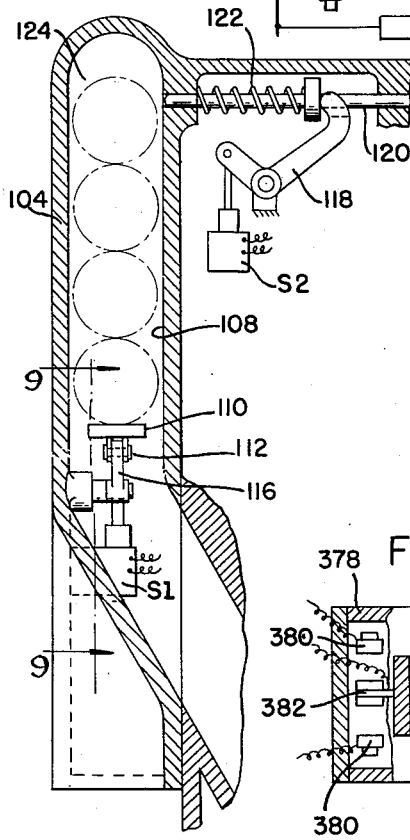
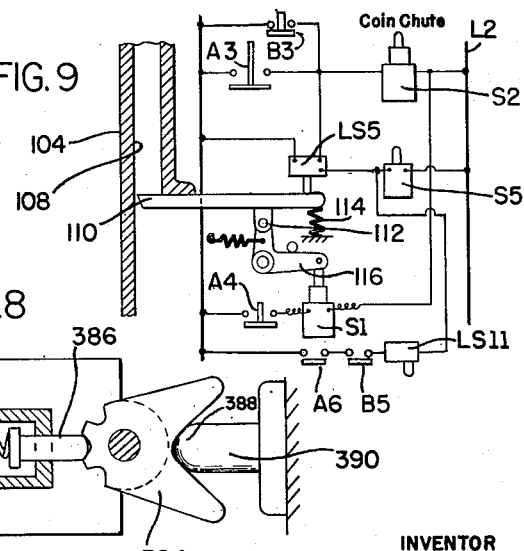
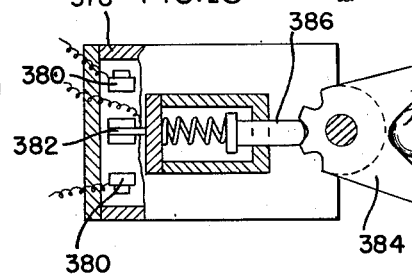
INVENTOR
DUDLEY M. LONTZ
By Toulmin & Toulmin
ATTORNEYS Oct. 12, 1954
D. M. LONTZ
2,691,448
AUTOMATIC MATERIALS HANDLING SYSTEM
Filed July 20, 1949
8 Sheets-Sheet 5
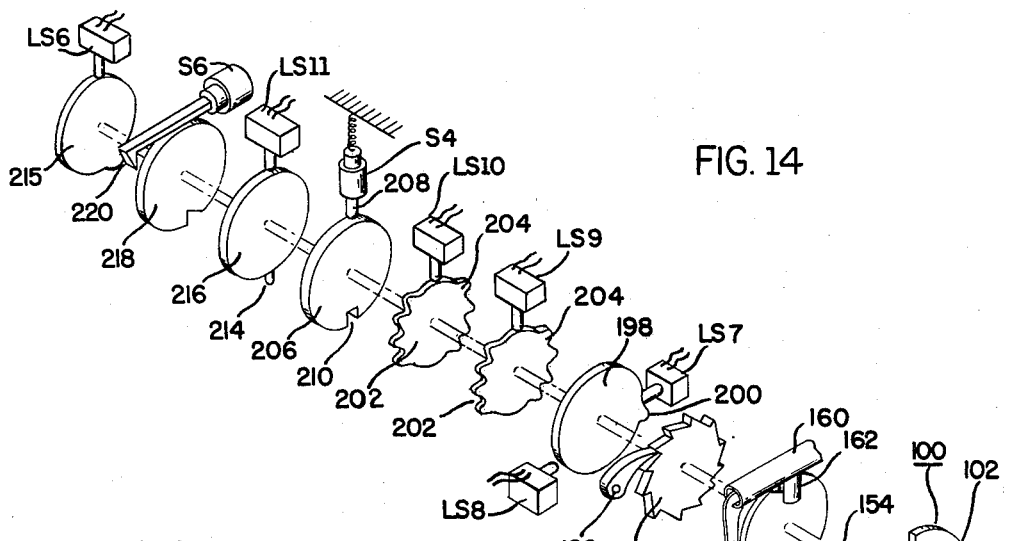
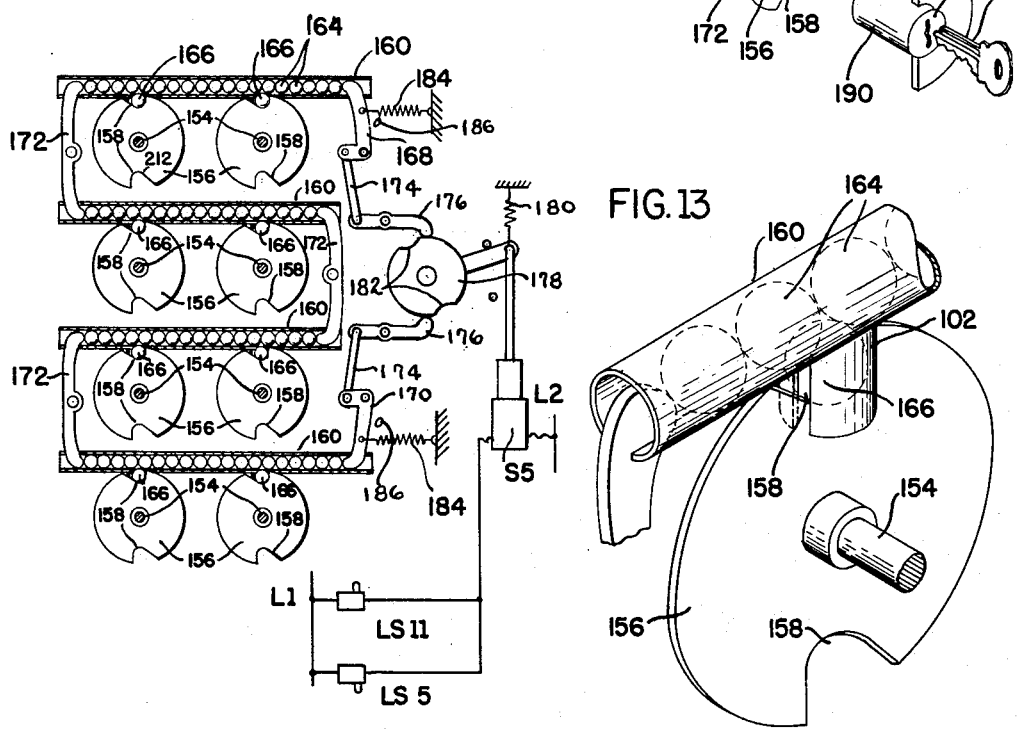
INVENTOR
DUDLEY M. LONTZ
By
Toulmin & Toulmin
ATTORNEYS

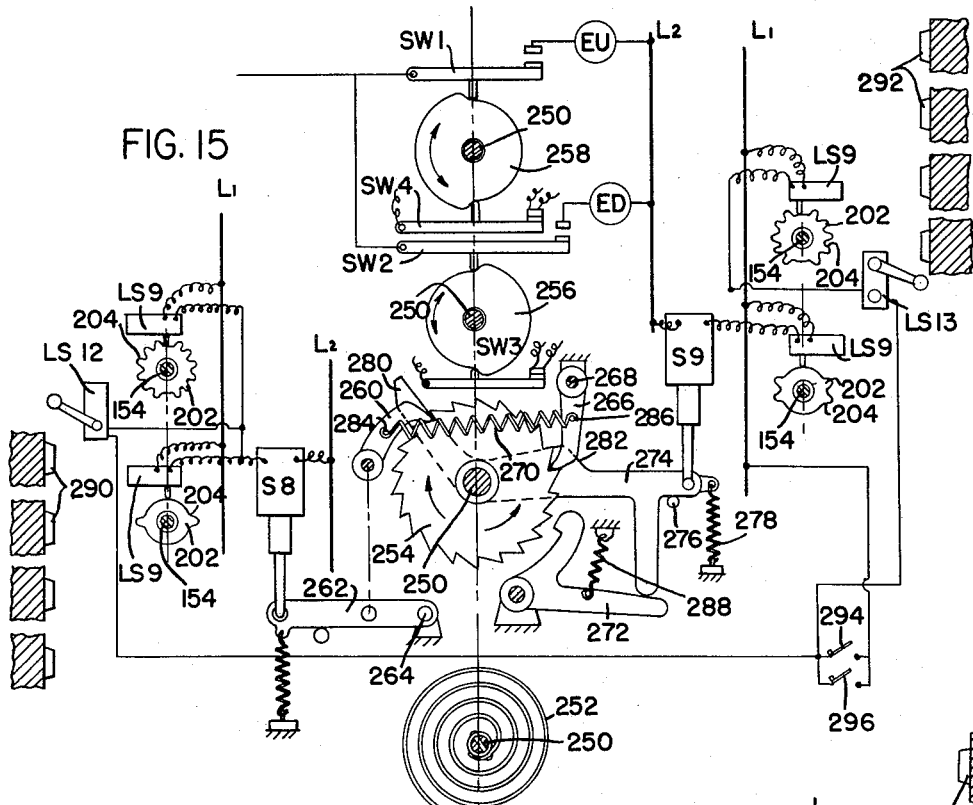
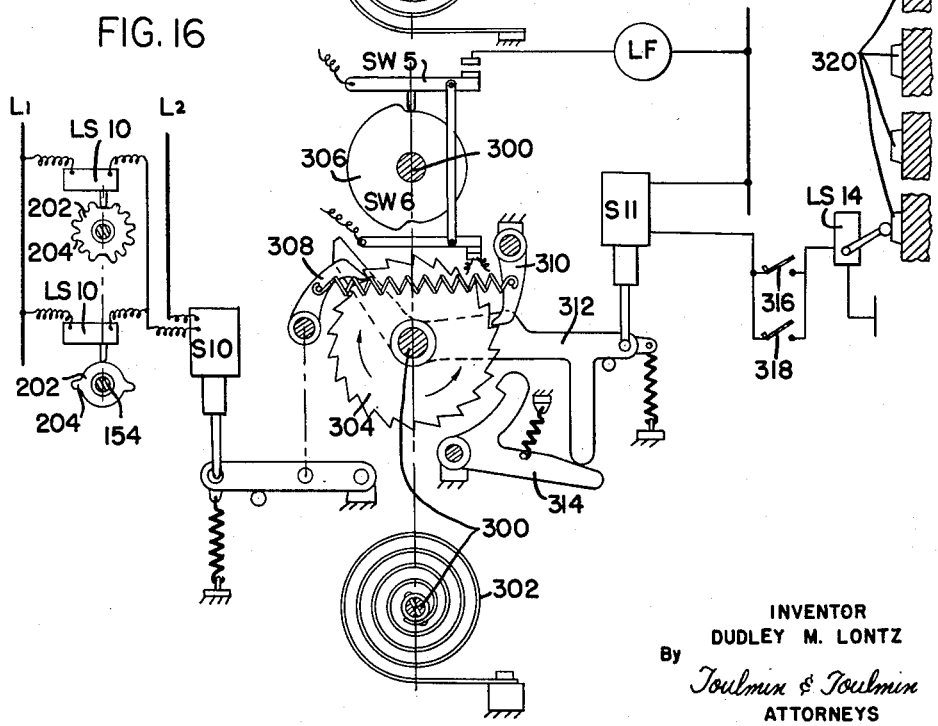

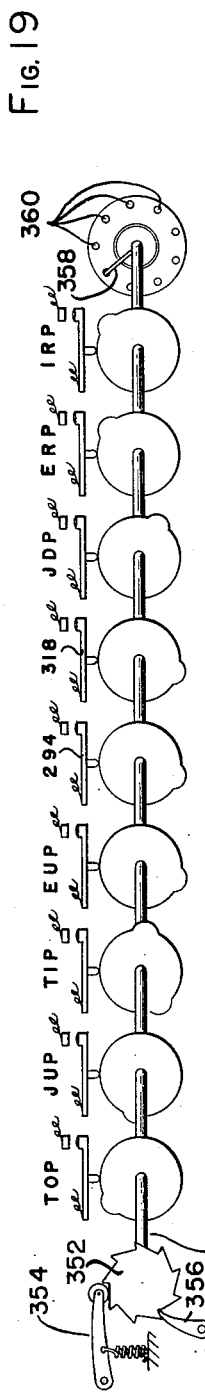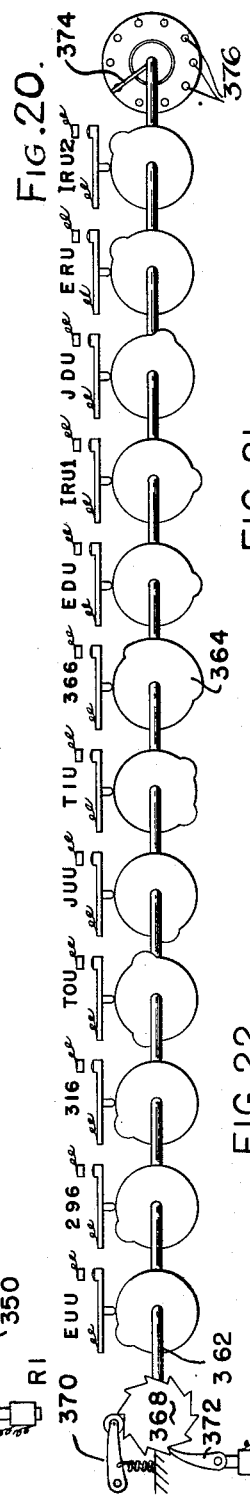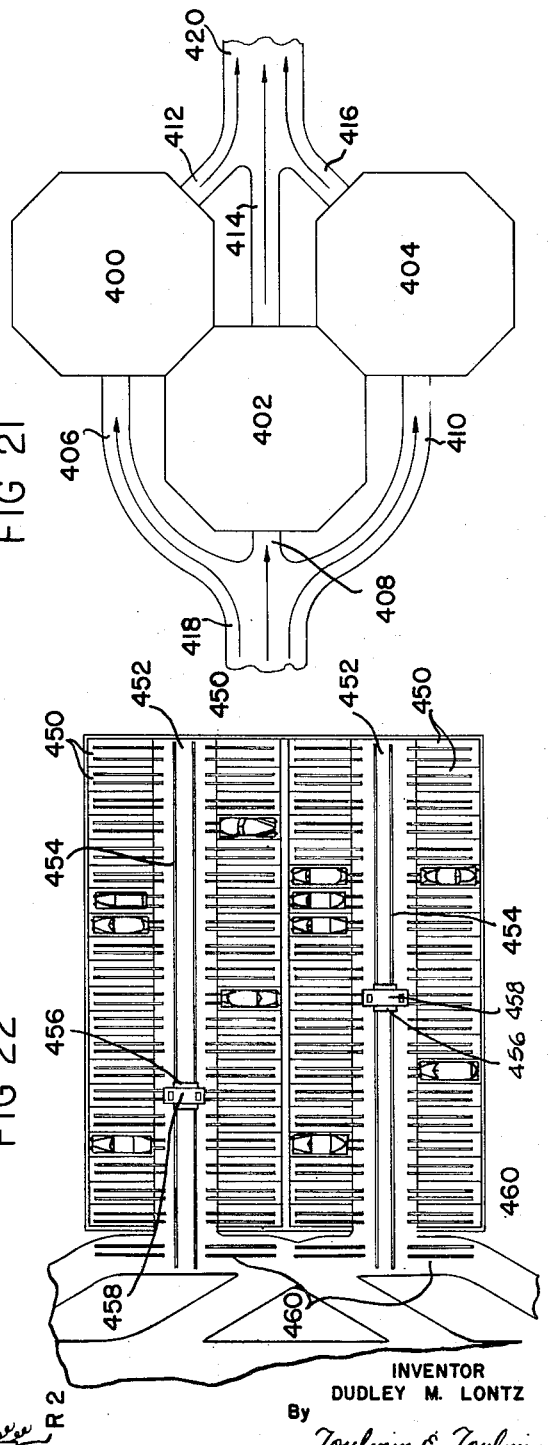

Patented Oct. 12, 1954

2,691,448

UNITED STATES PATENT OFFICE 2,691,448

AUTOMATIC MATERIALS HANDLING SYSTEM

Dudley M. Lontz, Indian Hill, Ohio

Application July 20, 1949, Serial No. 105,873

7 Claims. (Cl. 214—16.1)

This invention relates to storage systems having a plurality of storage areas or compartments. More particularly, this invention relates to a storage system of this type wherein the loads deposited in the said areas or compartments and subsequently removed therefrom are automatically handled throughout their travel through the system.

Storage systems of the general type referred to above are widely applicable for the handling of a great variety of materials which may take the form of substantially any article of commerce or manufacture. For example, the materials handled could comprise loads on pallets or skid platforms, or on trucks, or similar supporting means having their own wheels, such as caster wheels. In the particular case of automobiles and the like, the unit loads may be handled by conveying them on their own wheels. The automatic handling of loads of this type eliminates costly manual labor and avoids mistakes and accidents, which, especially in connection with the storage or parking of automobiles, is highly objectionable.

Among the many applications of a storage system of this invention are material warehouses for steel and other manufacturing materials which must be stored, but to which access must readily be had at all times. Other applications include grocery warehouses and the like, factory stock rooms, and warehouses and loading stations where articles of commerce are either placed on a carrier or transferred from one carrier to another, as, for example, the loading docks at sea ports.

A particularly apt application of this invention occurs in connection with the parking of automobiles, and it is in this connection that this invention is illustrated and described. It is to be understood, however, that the invention is by no means limited to this particular use.

In general, the object of this invention is to provide an automatic storage system wherein unit loads are automatically conveyed to and from a predetermined one of a plurality of storage areas or compartments.

A still further object is the provision of a storage system of the type referred to which will be relatively rapid in operation so that materials can be stored therein or removed therefrom comparatively rapidly.

Another general object of this invention is the provision of a control system for an automatic storage system of the type referred to including cycling shafts which positively control the order in which the storing and unstoring cycles are carried out.

Another object is the provision of suitable interlock arrangements such that the initiation of any cycle of operations automatically prevents initiation of any other cycle until the first initiated cycle has been completed.

Another object of this invention is the provision of a storage system of the type referred to and an automatic control system therefor, such that the said systems are highly flexible and can be adapted to any installation. For example, the storage system could be laid out on a single level, as in a parking lot, or on a single floor of a building, or could occupy several floors, either all above ground level or all below ground level, or divided, or could utilize any selected floors of a building structure. Similarly, the control system is flexible and can be adapted for utilizing any selected ones of the available storage areas or compartments of the space occupied by the storage system, and is further adaptable for establishing any predetermined relationship as to position between the entrance and exit of the storage system.

These and other objects and advantages will become more apparent upon reference to the following description taken in connection with the accompanying drawings in which:

Figure 4 is a transverse section through the elevator in the garage and is indicated by the line 4—4 on Figure 5.

Figure 5 is a sectional view similar to Figure 4 but taken at right angles thereto and is indicated by the lines 5—5 on Figures 1 and 4;

Figure 6 is a sectional view indicated by the line 6—6 on Figure 4 and showing some of the detail construction of the lifting truck carried by the elevator;

Figure 7 is a view looking in at a typical control panel for use in connection with the storage system of this invention. In the case of the parking garage illustrated, the control panel of Figure 7 takes the form of a key panel having a plurality of key operated switches thereon and with a coin receiving chute and a coin return chute;

Figure 8 is a sectional view taken through the coin chute of Figure 7.

Figure 9 is a vertical section indicated by the line 9—9 on Figure 8 and shows the means for releasing the coins from the coin chute when a cycle of parking or storage commences;

Figure 10 is a view showing the coin return arrangement associated with the control panel in Figure 7 and is indicated by the line 10—10 on Figure 7;

Figure 11 is a vertical sectional view indicated by the line 11—11 on Figure 10 and shows the manner of expelling coins from the coin return mechanism so they will fall into the coin return chute;

Figure 12 is a view showing the manner of interlocking all of the key operated mechanisms on the key panel of Figure 7 so that only one at a time thereof can be operated. In this figure there are only eight of the key operated mechanisms shown, but it will be understood that the interlock arrangement could be extended to as many key operated elements as desired.

Figure 13 is a perspective view showing more in detail one of the locking cams on the key operated mechanism and the interlock mechanism associated therewith;

Figure 14 is a perspective view showing one of the key operated mechanisms in its entirety. In Figure 14 the various cams and ratchet wheels mounted on the shaft controlled by the key have been somewhat spaced apart for greater clarity.

Figure 15 is a view showing a ratcheting selector arrangement employed in connection with the control system of this invention for preselecting the level at which the car is to be parked or the level from which the car is to be unparked;

Figure 16 is a view of a ratcheting type selector similar to that shown in Figure 15 but which is employed in selecting the particular station in which the car is to be parked or from which it is to be unparked;

Figure 18 is a view of a selector switch included in the control circuit of Figure 17 and arranged so as to indicate the position of the elevator relative to a certain floor and the position of the turntable on the elevator relative to a certain station;

Figure 19 is a view showing a cycle shaft arranged for controlling the switches of the circuit of Figure 17 during a parking cycle;

Figure 20 is a view similar to Figure 19 but shows the cycle shaft which controls the switches of the circuit of Figure 17 during an unparking cycle;

Figure 21 is a view showing a multiple arrangement of units according to my invention; and Figure 22 is a plan view showing a single-level multiple-aisle installation utilizing my invention.

GENERAL ARRANGEMENT

Figure 1:
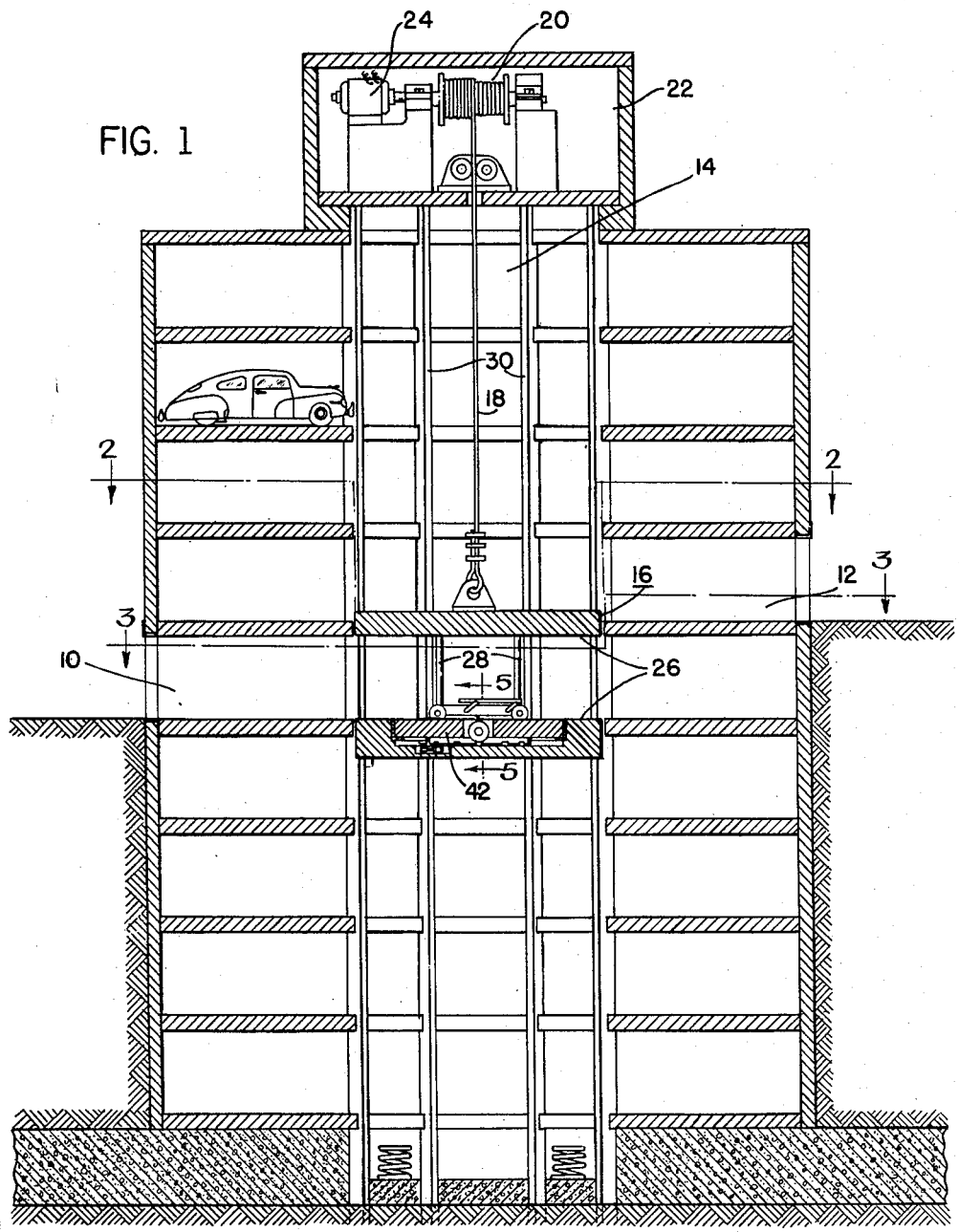
Figure 1 is a vertical sectional view taken through a parking garage embodying the features of my invention.

According to the embodiment of my invention which has been selected as a specific example of the principles thereof, there is provided a storage system laid out on a plurality of different levels such as the different floors in a building above and below ground level. Each level includes a plurality of storage stations. An elevator is included in the structure and is movable to any level thereof. The storage stations at the levels being used for storage are directly accessible to the elevator so the elevator can be provided with a turntable or with a shuttling table in order to position the materials thereon in alignment with the station in which they are to be stored.

According to the present form of this invention the elevator has thereon a turntable, and on the turntable is a self-propelled truck which can either move the articles to be stored into the elevator or move them therefrom. In the arrangement shown in the drawings, the articles being handled are automobiles, and the truck takes the form of a device adapted for engaging the underneath side of the rear axle of the car so as to be able to move it while it is supported on its own front wheels. Obviously, the truck could take other forms and could be provided with other devices for engagement with the automobiles to be handled by it.

The selection of the level and station in which the car is to be parked, or from which a car is to be unparked, is made at a central control panel consisting of a plurality of key stations, there being as many of these as there are parking stations in the structure.

When a car is parked in one of the storage compartments, the key pertaining to that compartment is removed from its lock, and then when it is wished to retrieve or unpark the car, the key is replaced in the lock and is again operated, and this results in an automatic unparking cycle during which the elevator and turntable move to the proper level and station. The truck moves the car onto the elevator, the elevator and turntable move to the unparking level and station, and the truck moves the car out of the elevator. Thereafter, the elevator and turntable automatically return to their loading positions.

An interlock is provided so that only a single parking or unparking cycle can be carried out at a time and none of the key operated stations can be operated until any cycle that is in process is completed. The various operations of the elements of the structure, such as the movement of the elevator up and down, the rotation of the turntable, the movement of the truck in and out of the elevator, and the raising and lowering of the truck for engagement with the underside of a car, are all controlled by cycle shafts which index to institute the next following step in the cycle immediately upon completion of the current step. This insures that there will be no loss of time and results in the most rapid operation of the system.

STRUCTURAL ARRANGEMENT

Garage structure

Figure 2:
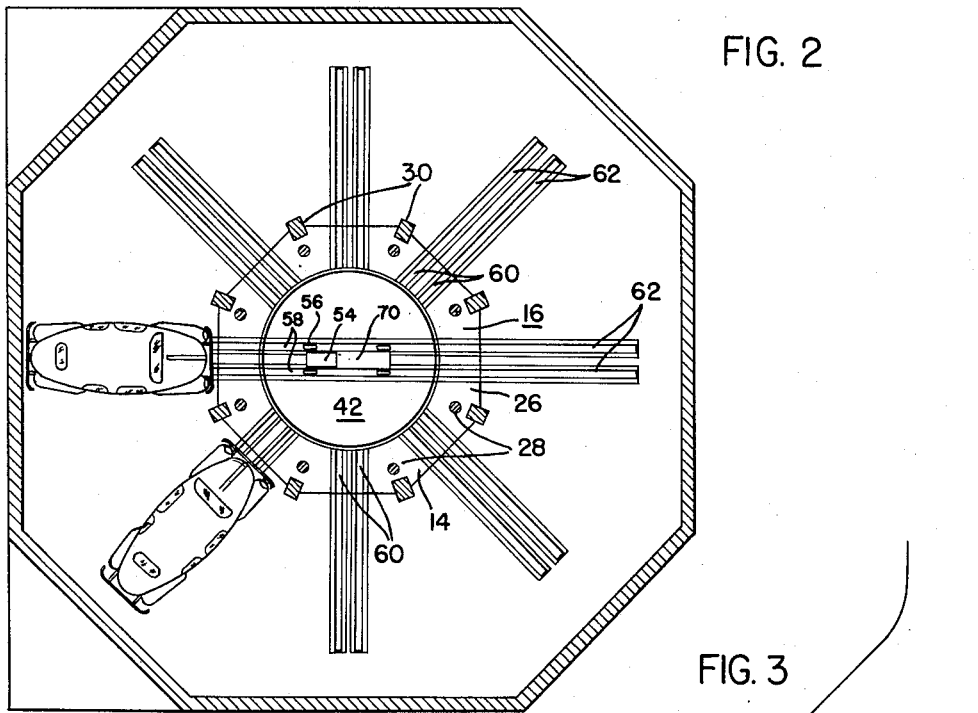
Figure 2 is a plan view taken over one of the storage levels in the garage and is indicated by the line 2—2 on Figure 1.
Figure 3:
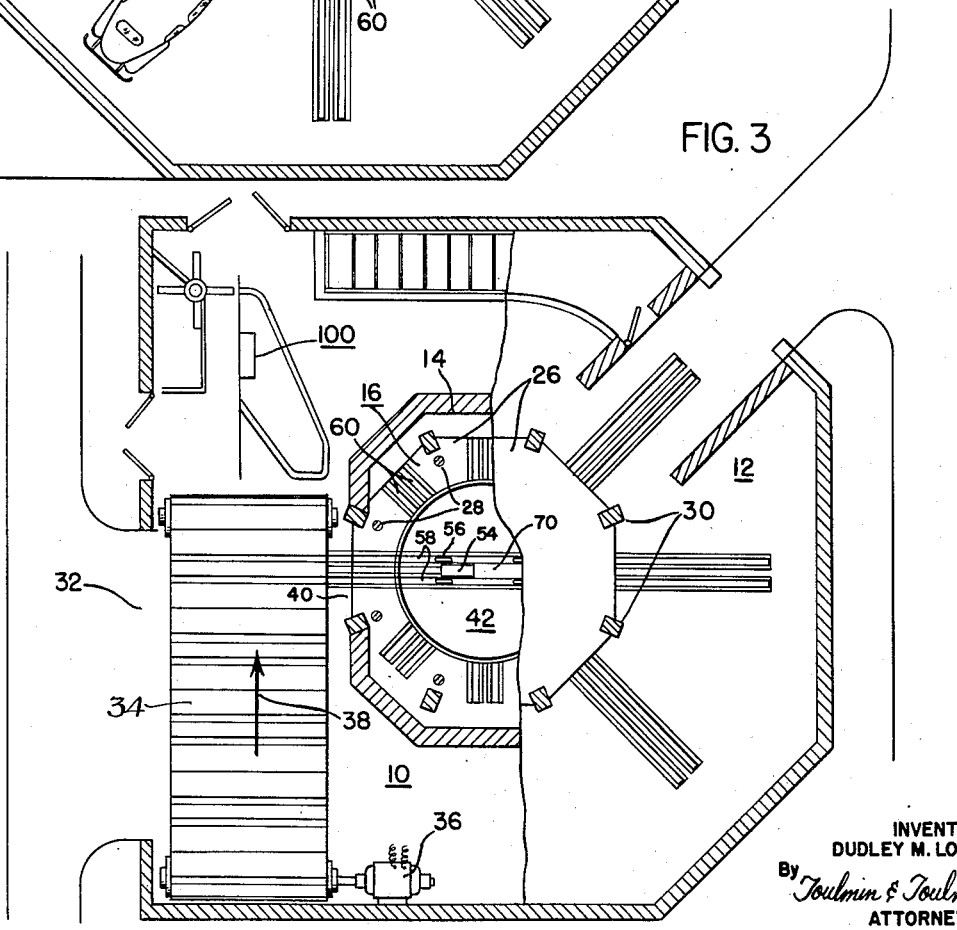
Figure 3 is a plan section indicated by the line 3—3 on Figure 1 and shows the loading level at the left side of the view and the unloading level at the right side of the view.

Figures 1, 2, and 3 show one form which a parking garage constructed according to this invention may take. It is understood, as mentioned before, that this invention is not limited to a parking garage, but is shown in this connection merely for the purpose of making an exemplary disclosure of the principles of the invention.

In Figures 1, 2 and 3, the garage structure will be seen to comprise a multi-level building having four parking floors below ground level and four parking floors above ground level. The ground level referred to is the level at which cars enter the garage, and this is indicated at 10. In Figure 1, the unloading or unparking level is at 12, which is one floor higher than the parking level. The arrangement has been so illustrated to provide for an extreme case to show the high degree of flexibility of a system according to this invention.

Centrally disposed in the garage structure is an elevator shaft 14 and vertically reciprocable in this shaft is an elevator 16 connected with the cable 18 which leads to a drum 20 in the elevator penthouse 22. A drive motor 24 is provided for reversibly actuating the drum 20 according to well known practices in the elevator art.

The elevator 16 comprises top and bottom members 26 interconnected by the circumferentially spaced vertical columns 28. The members 26 are guidingly engaged by the vertical rails 30 spaced around the elevator shaft. This arrangement will best be seen in Figures 1 and 2 where it will be noted that the spacing of the columns 28 and the rails 30 is such that there is space between each adjacent pair thereof for movement of a car. It will also be noted in Figure 2 that the elevator is substantially octagonal, and that there are provided eight parking stations around the elevator. The garage structure may itself be octagonal, as shown, or it may be cylindrical or of the more conventional rectangular shape, this latter case probably obtaining when a parking system according to this invention is installed in an existing building.

In Figure 3, it will be observed that the loading level at 10 consists of a relatively wide drive-in opening 32, and between the opening 32 and the elevator shaft is a movable platform 34. This platform is movable by a motor 36, and a number of cars can be parked on the said platform side by side. The platform is driven periodically in the direction of the arrow 38 to carry the cars thereon into alignment with the entrance 40 of the elevator shaft. The moving platform 34 is provided for enabling several cars to be driven off the street during periods of heavy parking demand. At other times, it is not necessary to operate the platform 34, and cars may be driven thereon directly in alignment with the entrance 40.

Figure 3 also illustrates the unloading or unparking level 12, and which is at a different level than the parking level 10, say, one level higher. It will also be noted in Figure 3 that the angular position of the turntable when cars are removed from the elevator at the unparking level is different from the angular position it occupies when cars are received on the elevator at the loading level. The arrangement shown in the drawings thus provides for an extreme case wherein the parking and unparking take place at different levels and at different angular positions of the turntable.

*Turntable and truck*

Centrally mounted on the lower member 26 of the elevator is a turntable arrangement 42. The turntable 42 is mounted in the elevator as by the bearing means 44 so as to be freely rotatable through 360 degrees. A ring gear 46 is carried by the turntable and is engaged by pinion 48 driven through the worm and wheel 50 by a reversible electric motor 52.

Mounted on the turntable 42 is a truck consisting of a frame 54 with supporting wheels 56. The wheels 56 are in the tracks 58 on the turntable and reference to Figure 2 will indicate that the lower member 26 of the elevator has tracks 60 thereon adapted for registration with the tracks 58 of the turntable in each indexing position of the turntable.

Each parking level, as will be seen in Figure 2, has tracks in each compartment which register with tracks 60 of the elevator when the elevator is stopped at that level and when the turntable is stopped at any one of the indexing stations. It will be seen, therefore, that the truck is guided continuously during all its operative movements in carrying out its storing and unstoring functions.

The truck carries in its frame 54 a reversible motor 64 which is connected through the gearing 66 and drive belt or chain 68 with one pair of the wheels 56. Driving of the motor 64 in one direction or the other will thus cause the truck to run in its tracks in either one direction or the other.

Carried on the frame 54 is a lift plate or car engaging member 70 which is connected with the arms 72 that are pivoted at one end to the frame 54 and at the other ends to the member 70. A connecting link 74 is connected between member 70 and a crank 76. The crank 76 is connected through the gearing 78 with a drive motor 80 mounted in the frame 54. It will be apparent that driving of the motor 80 will cause rotation of the crank 76, and that this rotation will act through the link 74 to raise and lower the car engaging member 70.

Upper and lower positions of the member 70 are determined by the limit switches LS1 and LS2, respectively, which are mounted in the frame 54 as shown in Figure 6, so as to be engaged by the crank 76 when member 70 occupies its uppermost and lowermost positions, respectively.

It will be evident that the truck arrangement shown is not the only form which this part of my storage system can take. For example, a truck could be hydraulically or pneumatically operated as well as electrically, and could, where the lengths of travel were not too great, be slidably mounted on the turntable whereby tracks 60 and 82 could be dispensed with.

Electrical energy is supplied to the motors 64 and 80 by a cable 82 passing over a reel or drum 84 carried in a center cavity in the turntable 42. This drum is continuously biased to wind up the cable thereon by a torsion spring 86 and rotates to pay out cable as the truck is driven from its central position on the elevator. The rotation of the drum 84 by the cable 82 as the truck moves is employed for determining the limits of movement of the truck. As will be seen in Figure 5, there is mounted on the shaft of the drum 84, or otherwise arranged so as to rotate in synchronism therewith, a threaded rod or shaft 88.

Mounted on this shaft is a cam 90 which is restrained against rotation by the guide rod 92 so that as the drum turns in one direction, the cam moves one way along the rod 88, and as the drum rotates in the opposite direction, the cam moves in the other direction along the rod 88. When the truck is centrally located on the turntable 82, the cam 90 is in engagement with limit switch LS3. When the truck has moved to its extreme outer position for engagement with a car to be moved onto the elevator or in discharging a car from the elevator, the cam 90 is in engagement with limit switch LS4. It will be evident that the cable 82 is preferably substantially nonextensible, and that to this end, it may advantageously include, in addition to the conducting wires therein, a braided metallic sheathing, or a steel cable, or small wire rope integrally associated therewith to reduce its stretch to a tolerable minimum.

Control panel

According to this invention, all the operative movements of the elevator, turntable, and truck in both parking and unparking cycles are controlled from a central station. In the case of a factory warehouse, or a stock room, such a control station might take the form of a plurality of push buttons or other switch means or of selector devices operated by punched cards or the like.

In the present instance, that is, in connection with a parking garage, it is preferable for the control panel to be operated by keys so that the cars are effectively locked in their parking station and so no unauthorized persons can remove cars from the garage. Such a control panel is illustrated in Figure 7. In Figure 7, there is a panel 100 and positioned thereon are a plurality of rotatable key operated elements 102, one for each parking station in the garage. When the garage is empty, each of the elements 102 has a key therein, but when a car is positioned at the loading station, and one of the keys rotated, the car will be automatically conveyed to and parked or stored in the area corresponding with the said key. At this time, the key is removed from the lock and the car can only be removed from the station by replacing the key in the lock and again actuating the rotatable key operated element.

In connection with a parking garage, the control panel includes a coin receiving chute 104, and this is so arranged that the proper number of coins of the proper denominations must be placed therein before any of the keys in the control panel can be released. The coin panel also includes a coin cup 106, and when a car is unparked from the garage by inserting the key in the proper lock and turning it, a certain number of coins, depending on the length of time the car has been parked in the garage, will be returned to the coin return chute.

Coin chute and coin return

Figures 8 and 9 illustrate one form which the coin receiving chute 104 may take when the parking fee is prepaid. Figure 8 indicates that the chute 104 includes a coin receiving passage 108 which is closed at its bottom end by a plate 110 so that only a certain number of coins can be placed in the chute. In Figure 9, it will be seen that the plate 110 is pivoted at 112 and is normally retained in its coin supporting position by a spring 114. When the proper number of coins is introduced into the passage 108, the weight thereof will overcome the spring 114 and permit the plate 110 to tilt slightly about its pivot 112. This brings about actuation of switch LS5 which will initiate a parking cycle, as will be explained in connection with the control system.

As will also be seen hereinafter, after the parking cycle has been initiated, a solenoid S1 is energized by closing of blade A5 of relay A which rotates lever 116 to move plate 110 rightwardly, thereby to permit the coins in passage 108 to drop down through the chute into any suitable receiving bin. At the same time as solenoid S1 is energized, a second solenoid S2 is energized, and this is connected with a bell crank 118 acting on a plunger 120 which is normally urged into its Figure 8 position by a spring 122. Upon energization of solenoid S2, plunger 120 is moved leftwardly from its Figure 8 position to cover the coin receiving opening 124 in the upper end of chute 104 so that no other coins can be placed in the chute. As will be seen hereinafter, solenoid S2 becomes energized upon the initiation of any cycle of operation and remains energized by virtue of the parallelly connected blades A3 and B3, one of which is always closed during a cycle of operation.

The coin returning mechanism is shown in Figures 10 and 11. This mechanism operates to return an assortment of coins of predetermined denominations when a car is removed from its parking space, provided the car has not been left over a predetermined length of time. If the car has been left over a predetermined length of time, the coin return mechanism includes an arrangement for making the particular key station pertaining to that particular area or compartment inoperative, so that an attendant must be called in order to remove the car from storage.

In Figure 10 it will be seen that there are a plurality of vertical tubes 126 adapted for having stacked therein coins of different denominations. The denominations of the coins in the tubes are indicated thereon, and it will be noted that there are two tubes of quarters, two tubes of dimes and one tube of nickels. The particular assortment is purely exemplary, and any other arrangement could be made.

Each of the tubes 126 has its lower end spaced above a plate 128 a distance slightly greater than the thickness of the coins in the tube, as will be seen in Figures 10 and 11. Reciprocably mounted on the plate 128 is a slide plate 130, one for each of the tubes 126. The slide plates are biased toward their Figure 11 position by springs 132 extending between first pins carried on the slide plates and second pins fixed in the plate 128. Associated with each slide plate is a bell crank lever 134 with which is associated an actuating solenoid S3. Upon energization of S3 of any of the tubes 126, the plate 130 is moved so as to eject the lowermost coin in the tube. The plate 130 will prevent any other coins from feeding from the bottom of the tube until the said plate is again retracted to its Figure 11 position. Thus, upon each energization of the solenoid S3 one coin is ejected from the associated coin tube.

As will be seen in Figure 10, the bell cranks 134 are preferably all mounted on a suitably supported transverse shaft 136, and the several solenoids S3 are arranged therebeneath as diagrammatically illustrated in this view. The coins ejected from the tubes by reciprocation of the plate or plates 130 fall into the coin return chute 138 and slide down into the cup part 106 which was referred to in connection with the description of the key panel of Figure 7.

A determination of the assortment of coins to be ejected into the coin return chute is made by a mechanism also shown in Figure 10. This view shows a timing motor TM which is shown connected between the power lines L1 and L2 and in series with a relay blade A5 which will be more fully described hereinafter. The blade A5 closes when a parking cycle is initiated, and this energizes the timing motor, whereupon blade T1 of the motor closes and by-passes the blade A5. The timing motor remains energized through its blade T1 until the circuit is interrupted by turning of the key operated mechanism for unparking the car. At this time, the blade B4 is opened upon initiation of an unparking cycle to de-energize the timing motor and to reset the entire mechanism.

The timing motor is connected with a rotary arm 140 having a contact element 142 thereon positioned to sweep over a circular contact bank consisting of a plurality of radially spaced contact segments arranged in circumferentially spaced groups. As shown, each of the groups of contact elements comprises three radially spaced contacts, although all of the elements in every group are not operative. In the first group of contact elements, the outer two thereof are connected by the wires 144 with the solenoids S3 associated with the two quarter tubes of the coin return mechanism. The second group of contact elements has its three contacts connected by the wires 146 with the solenoids S3 associated with one of the quarter tubes and with two dime tubes. Similarly, the third group of contact elements are connected by the wires 148 with the solenoids S3 with one of the quarter tubes, one of the dime tubes, and the nickle tube.

Similarly, the other groups of contacts around the contact bank are connected in with the solenoids S3 so as to return decreasing amounts when the car is unparked.

The last contact group, indicated at 150, is connected through the normally closed pushbutton 152 with a locking solenoid S4 associated with the key operated mechanism. When the parking cycle is initiated and the motor TM is energized, it commences to drive the arm 140 to carry contact 142 over the contact bank in a clockwise direction. The contact 142 will sweep around the contact bank. If the car is unparked before the contact 142 reaches the contact group at 150, the rotation of the key operated element will close limit switch LS6 to complete a circuit through the ones of the solenoid S3 connected with the contact group with which contact 142 is at that time in engagement.

If, however, the contact 142 has reached the contact group at 150, then the solenoid S4 is energized, and this locks the key operated element so that the car cannot be unparked. At this time, it is necessary to call an attendant who will collect the necessary fee for over-time parking and manually open switch 152, which will permit a car to be unparked in the normal manner.

*Control panel lock*

The control panel is provided with a locking mechanism which prevents operation of any of the key shafts to initiate a parking cycle until the proper fee has been deposited in the coin chute. This locking mechanism also acts as an interlock to prevent the turning of more than one key shaft at a time and also prevents turning of any of the shafts as long as a parking or unparking cycle is in progress. Reference to Figures 12 and 13 will indicate the preferred form which this locking mechanism takes. In Figure 12, there are shown eight key operated elements in the form of rotary shafts and having cams thereon which cooperate with the other parts of the locking mechanism. It will be evident that while there are only eight shafts illustrated, there could be as many thereof as desired for the same locking instrumentalities employed.

Referring more particularly to Figures 12 and 13, each of the key operated shafts is indicated at 154 and mounted on each shaft is a cam 156 having the diametrically opposite notches 158. Extending across the tops of the cams are a plurality of tubes 160 so located that the inside diameters of the tubes are approximately tangent to balls 166 bottomed in notches 158 in cams 156. Dependent from each tube vertically over the center of each cam and embracing the periphery of the cam is a short section of tubing, indicated at 162. Within the tubes 160 are placed a plurality of balls 164, and in each of the tubes 162 there is spaced for one ball 166. It will be noted that the centers of the balls 166 fall directly below the points of abutment of the pair of balls in the tubes 160 directly therover.

At the right end of the upper tube 160 there is a lever 168 having a nose part extending into the tube and bearing against the end ball thereof. A similar lever 170 is arranged at the right end of the lowermost of the tubes 160 and also has a nose part bearing against the end ball in the said tube. The left ends of the two upper tubes 160 receive the nose parts of the ends of a lever 172 pivoted intermediate its ends. Similar levers 172 are arranged in the left ends of the two lowermost tubes 160 and the right ends of the tubes intermediate of the tubes 160.

It will be apparent that with the levers 168, 170 and 172 in the positions shown, the balls in the tubes 160 are closely confined and cannot move any substantial distance in any direction. Accordingly, the balls 166 are also confined, and this, in turn, provides positive locking means for the cams 156 and shafts 154.

In order to increase the clearance in the system of balls in the tubes 160 so that one of the balls 166 can be pushed therein to permit rotation of the associated cam 156 and shaft 154, the levers 168 and 170 are movable to withdraw their nose parts from the ends of the adjacent tubes 160 by an amount equal to the radius of one of the balls in the tubes. This is accomplished by connecting the levers 168 and 170 through links 174 with the levers 176 which bear in the periphery of a cam 178 urged toward its Figure 12 position by a spring 180 and movable clockwise by energization of a solenoid S5 to carry the notches 182 into alignment with the ends of the levers 176. With the cam 178 so shifted, the springs 184 will move the levers 170 against the stop pins 186 and provide space in the tubes 160 for receiving one ball. At this time, any one of the shafts 154 with its cam 156 can be rotated. Rotation of any one of the shafts or cams displaces the ball 166 pertaining thereto into the adjacent tube 160 and takes up substantially all of the clearance in the ball system in the tubes 160.

The locking device now operates as an interlock and positively prevents any other shaft from being rotated until the shaft which is being turned has rotated far enough to permit its associated ball 166 to drop into the other of its notches 158. As will be seen hereinafter, rotation of any of the shafts 154 is accompanied by de-energization of the solenoid S5 so that none of the remaining shafts can be rotated immediately due to the absorption of all of the clearance in the ball system as the then acting ball recedes in the second notch 158 in its cam 156 as the associated shaft 154 is rotated through the final portion of its movement.

The solenoid S5 is energized only at the beginning of either a parking or an unparking cycle and cannot thereafter again be energized until the said cycle is completed. This provides a lock which prevents rotation of any of the shafts for either parking or unparking until the cycle then in progress is completed.

*Key operated mechanism*

As mentioned previously, there is provided a separate key operated shaft for each storage area or compartment in the system. These key operated shafts are all interconnected by the locking mechanism described above which is operable, first, to prevent turning of any of the shafts for a parking cycle until the proper fee has been deposited, second, to prevent turning of more than one thereof at a time, and, third, to lock all of the shafts against rotation during the carrying out of any cycle of operations.

A typical one of these shafts 154 is illustrated in Figure 14. In this figure it will be noted that shaft 154 extends into a lock 190 having a key 192. Mounted on the shaft 154 are a plurality of operative elements including a ratchet wheel 194 having a pawl 196. This insures that the shaft can only be rotated in one direction, in the example shown, clockwise, thereby insuring the proper number of actuations of impulse switches LS9 and LS10, the functions of which will be described presently.

The shaft also mounts a cam 198 having a lobe 200 adapted for engagement with the cycle control switches LS7 and LS8, one of the switches being operated on each half revolution of the shaft 154. As shown, the switch LS7 is for initiating the parking cycle, and switch LS8 for initiating the unparking cycle.

Also mounted on the shaft 154 are a pair of selector cams 202 having associated therewith the impulse switches LS9 and LS10. Each of the cams has a plurality of notches arranged in diametrically opposed groups, as indicated at 204, so that on each half revolution of the shaft 154, the impulse switches associated with the cams are operated a predetermined number of times. As it will be seen hereinafter, the impulse switch LS9 is operable for automatically determining the level or floor on which the car is to be parked, whereas the impulse switch LS10 automatically determines the particular station on that floor for receiving the car. Conversely, when a car is to be unparked, these switches and cams determine the floor and station from which the car is to be taken. These switches, therefore, determine the particular one of the several storage compartments in the system which pertains to the associated key shaft.

The previously referred to locking solenoid S4 will be seen in Figure 14 to cooperate with a locking member 206 on the shaft 154. The solenoid S4 controls a plunger 208 adapted for entering a notch 210 in the member 206 to prevent rotation of the shaft 154 until the said solenoid has been de-energized.

Returning for the moment to Figure 13, the releasing of the balls locking the key operated shafts is accomplished when it is desired to park a car by the introduction of coins into the coin chute shown in Figures 8 and 9. This is accompanied as will be seen in Figure 9 by the completion of a circuit through the ball release solenoid S5 by closing of limit switch LS5 which is controlled by plate 110 at the lower end of the coin chute. However, when unparking a car, no coins are in the coin return chute, and means must be provided for unlocking the balls to permit turning of one of the key shafts.

In Figures 12 and 13 it will be observed that there is necessarily a slight clearance between each of the balls 166 in the dependent tubes 162 and the balls thereabove in the tubes 160. This clearance must necessarily exist to permit horizontal movement of the balls within the tubes 160. Such horizontal movement of the balls in tubes 160 takes place when a key shaft is turned and forces its locking balls 166 upwardly into one of the said tubes.

This slight amount of clearance is utilized for bringing about the unlocking of the locking system when it is desired to unpark a car by arranging the lobe 214 of cam 216 on shaft 154 so that the amount of movement of the said shaft permitted by the aforementioned clearance will bring the said cam lobe into engagement with energizing switch LS11. This manner of unlocking the ball system for initiating an unparking cycle is necessary because at that time no coins are deposited in the coin chute to bring about the unlocking as in the case when a parking cycle is to be initiated.

Switch LS11 is connected in circuit with the ball releasing solenoid S5, as is indicated in Figure 9, and actuation of the said switch by the cam lobe will immediately bring about energization of this solenoid. This energizing switch is ineffective during a parking cycle due to blade A6 of relay A which is open whenever a parking cycle is in progress. Another relay blade B5 is also in series with LS11 and S5 and prevents energization of S5 during an unparking cycle.

In order to prevent anyone from turning the shaft 154 only far enough to close switch LS11, thereby unlocking the ball system and rendering the locking means ineffective, there is provided a power drive for the shaft 154 during the unparking cycle. This takes the form of a notched disk 218 on shaft 154 and a solenoid operated latch member 220 adapted for engagement with the notched disk for positively shifting the shaft 154 at least far enough around to take up all the clearance in the ball system. The solenoid associated with latch member 220 is indicated at S6. This solenoid is energized simultaneously with the closing of switch LS11 so that no time elapses from the unlocking of the balls to the power movement of the key shaft. This positively prevents anyone from releasing the ball system by partly turning of one of the key shafts and the halting movement of the shaft so that any other key shaft in the system could be turned for parking a car whether any coins were in the coin chute or not.

*Storage area selection*

It has been mentioned before that each key operated shaft in the control panel pertains to one and only one storage area or compartment in the storage system. This relationship obtains regardless of the number of storage areas or compartments in the storage system or the particular distribution thereof on single or multiple levels. Thus, when a unit load is to be stored in the storage system, or as in the particular example illustrated, a car is to be parked, rotation of a key shaft will deliver a load or car to a definite storage area in the system.

The determination of the particular area or storage compartment to be used is made by the selection of the key shaft pertaining to that area or compartment. In the case of the parking garage arrangement illustrated, the vacant storage areas or compartments are indicated by the keys that remain in their respective locks, and, in parking a car, any of the spaces so indicated as available can be selected for use. The determination of the area or compartment from which a car is to be removed is, of course, made in the same manner, except that in the case of a key operated control panel, only the lock associated with a certain key can be operated thereby.

Rotation of a key shaft of the control panel operates to determined the delivery of a load to the storage area or compartment associated with that shaft and the removal of a load from the said storage area through the operation of the impulse switches LS9 and LS10, which control devices that have at least as many combinations of operative positions as there are storage areas in the storage system. These devices are, in effect, coordinate determining instrumentalities, and it will be evident, as this description proceeds, that as many instrumentalities as are necessary to determine the exact position of a particular storage area can be provided and controlled in the manner described.

In the particular example being illustrated, that is, a parking garage for automobiles, there are two coordinate determining devices that are controlled by the impulse switches LS9 and LS10 as the key shafts are rotated. One of these devices may be referred to as the floor or level determiner, and the other thereof as the station determiner, the station referring to the indexed position of the turntable. It will be evident, in connection with the parking garage arrangement illustrated, that each combination of positions of these determining device is associated with one, and only one, of the storage areas or compartments in the system.

The particular form which the determining devices take in this invention are arrangements for storing impulses. These impulses are initiated by a manually operated means, such as a key shaft, and are transmitted to and stored in the control mechanism for either the elevator or the turntable. Thereafter, when the corresponding member moves, the impulses originally stored in the device are cancelled therefrom by impulses initiated by movement of the said member and affecting the device oppositely to the first mentioned impulses.

According to this invention, impulses are simultaneously delivered to both the level determining device and the station determining device by rotation of a key shaft. Thereafter, movement of the elevator initiates impulses to cancel out those originally stored in its determining device so the elevator comes to a halt at the proper level, while movement of the turntable initiates impulses which cancel out those originally stored in its control device.

Reference will now be made to the specific form that these devices take in connection with a parking garage installation such as is illustrated.

*Level determining instrumentality*

The preferred form that this instrumentality takes in connection with a multi-level parking garage is shown in Figure 15. In this figure, there is a shaft 250 continuously biased by a torsion spring 252 in one direction. The shaft carries a ratchet wheel 254 and a pair of cams 256 and 258. The aforementioned cams are for selectively operating switches indicated SW1 and SW2. It will be evident that when shaft 250 rotates clockwise from its illustrated position, switch SW1 will be closed, and when the shaft rotates counterclockwise, switch SW2 will be closed. These switches are connected with control means for the elevator hoist motor 24, as will be more clearly seen in Figure 17, and closing of SW1 determines that the elevator will go upwardly from the loading level, while closing of SW2 determines that the elevator will move downwardly from the loading level.

Two other switches, SW3 and SW4, are provided in association with cams 256 and 258; and these switches are both closed only when the shaft and cams occupy their Figure 15 position. One of these switches will be opened whenever the level determining instrumentality is moved from its Figure 15 position by rotation of one of the key shafts. Thereafter, the switch will remain open until the elevator has reached its proper level in the carrying out of whichever cycle was initiated by rotation of the key shaft. At this time, the level determining instrumentality is returned to its Figure 15 position, and switches SW3 and SW4 are again both closed and cooperate in institution of the next step of the cycle then in progress.

Associated with ratchet wheel 254 are a plurality of pawl means, one of which is indicated at 260, and which is carried on an arm 262 pivoted at 264 and adapted for movement by energization of a solenoid S8. A second pawl 266 is stationarily pivoted, as at 268. A spring 270 acts between pawls 260 and 266 and urges them against the periphery of ratchet wheel 254. It will be evident that energization of S8 will cause arm 262 to move clockwise about its pivot 264, and to cause pawl 260 to advance ratchet 254 under pawl 266. The latter pawl, of course, will retain ratchet wheel 254 in its advanced position.

Another pawl member is indicated at 272 and is normally out of engagement with the periphery of ratchet wheel 254, due to its engagement by a part of arm 274 pivoted on shaft 250. Arm 274 is normally held in its Figure 15 position against stop pin 276 by a spring 278. A solenoid S9 is energizable for rotating arm 274 counterclockwise about shaft 250. Arm 274 has two cam surfaces thereon at 280 and 282. The one cam surface at 280 is adapted for engagement with a pin, as at 284, on pawl 260 to move the pawl out of engagement with the ratchet wheel 250. Similarly, the other cam surface at 282 is adapted for engagement with pin 286 on pawl 266 for moving this pawl out of engagement with the ratchet wheel at the same time pawl 260 is disengaged.

Simultaneously with these disengaging movements of pawls 260 and 266, pawl 272 is released so its spring 288 will move it into effective position against the ratchet wheel. It will be apparent that the above-described movement of arm 274 results in a counterclockwise movement of shaft 250 and ratchet wheel 254 by somewhat less than one tooth space due to the action of spring 252. Subsequently, when S9 is de-energized and spring 278 returns arm 274 to its Figure 15 position, pawls 260 and 266 are again released to effective position, while pawl 272 is disengaged from the ratchet wheel, whereupon spring 252 moves said shaft and wheel to complete the remainder of the movement necessary to take up one tooth space.

At this point, it will be observed that intermittent energization of S8 will bring about the stepping clockwise of shaft 250 and ratchet wheel 254 by a tooth at a time. Similarly, intermittent energization of S9 will bring about a corresponding tooth by tooth movement of the ratchet wheel in the opposite direction.

Connected in parallel with each other and in series with ratcheting solenoid S8, between power lines L1 and L2, are the impulse switches LS9, each of which is associated with one of the key shafts in the system. When any of these key shafts is rotated for either parking or unparking a car, the cam 202 thereon will bring about intermittent closing of associated switch LS9 and therethrough intermittently energize solenoid S8.

Similarly, S9 is serially connected with others of the parallelly arranged impulse switches LS9 controlled by others of the cams 202.

The parking or unparking cycle being carried out will be accompanied by movement of the elevator away from the loading level either upwardly or downwardly as determined by the instrumentality. Movement of the elevator will continue after initiation of a cycle until the level determining instrumentality has been restored to its Figure 15 position, at which time SW1 and SW2 are open and the elevator hoist motor is de-energized thereby. The restoring of the said instrumentality is accomplished by indexing the shaft and ratchet wheel one tooth space each time the elevator passes a floor and in the opposite direction to which the shaft and ratchet wheel were indexed by actuation of the key shaft. To this end, the elevator carries a pair of impulse switches LS12 and LS13, the former of which is operative by the cams 290 in the elevator shaft on the floors below the loading level, and the latter of which is operative by the cams 292 above the loading level. Switch LS12 is in series with solenoid S8 and a pair of conditioning switches 294 and 296. Switch LS13 is similarly connected with S9 and switches 294 and 296. These last-named switches are closed, one during a parking cycle when the elevator is moving away from the loading level, and the other during an unparking cycle during a corresponding period. Thus, if the ratchet wheel has been indexed clockwise, say, fourth teeth, then when a cycle is commenced, the elevator will move upwardly four floors due to the closing of switch SW1. At each floor switch LS13 will be momentarily closed and permit the ratchet wheel to move counterclockwise one tooth. When the elevator reaches the fourth floor, the movement of the ratchet wheel and cam will open switch SW1 and de-energize the elevator hoist motor. When the elevator returns from that floor to the loading level, switches 294 and 296 will be open and actuation of switch LS13 will be without effect.

The opposite action takes place if the ratchet wheel 254 has been initially indexed in a counterclockwise direction, except that under such circumstances, switches LS12 and cams 290 would be operative during the movement of the elevator for indexing ratchet wheel 254 in a clockwise direction until the elevator has reached that floor at which SW2 opens and de-energizes the elevator hoist motor.

*Station determining instrumentality*

The arrangement shown in Figure 16 is for the purpose of determining the station in which a car will be parked or from which it will be unparked. The mechanism shown is substantially identical as that shown in Figure 15 and includes the shaft 300 biased in one direction by a spring 302 carrying a ratchet wheel 304 and cam 306.

Cam 306 controls switches SW5 and SW6, the first of which determines the energization and de-energization of the turntable drive motor 52, and the latter of which cooperates with switches SW3 and SW4 for instituting the next step in the cycle being carried out when both elevator and turntable have reached their designated positions.

Associated with ratchet wheel 304 is pawl 308 and ratcheting solenoid S10 which corresponds to pawl 260 and ratcheting solenoid S8 on Figure 15. Pawl 310 corresponds to pawl 266 of Figure 15, and arm 312 and ratcheting solenoid S11 correspond with arm 274 and ratcheting solenoid S9 of Figure 15. Pawl 314 of Figure 16 corresponds with pawl 272 of Figure 15.

Ratcheting solenoid S10 is connected between the power lines L1 and L2 in series with the parallelly connected impulse switches LS10 which are actuated by cams 202 mounted on the key shafts as previously explained.

Solenoid S11 is connected in series with impulse switch LS14 and the parallelly arranged conditioning switches 316 and 318 which correspond with 294 and 296 in Figure 15, in that one of each thereof is closed on each of the parking and unparking cycles and during the period of time that the turntable is moving from its loading position to the selected station. Cams 320 are arranged on the elevator platform and switch LS14 is rotatable with the turntable so as to be intermittently actuated by cams 320 as the turntable turns.

It will be evident that rotation of the key shaft for either parking or unparking operations will index ratchet wheel 304 clockwise a predetermined number of teeth. Thereafter, when the turntable rotates, its movement will continue until switch LS14 has been actuated the same number of times by the cams 320 as the number of teeth the said ratchet wheel was initially indexed by impulses to solenoid S10. When the turntable reaches its proper position, switch SW5 will open and de-energize the drive motor, and SW6 will close for cooperation in the institution of the next step in the cycle then in progress.

*Control system*

Figure 17:
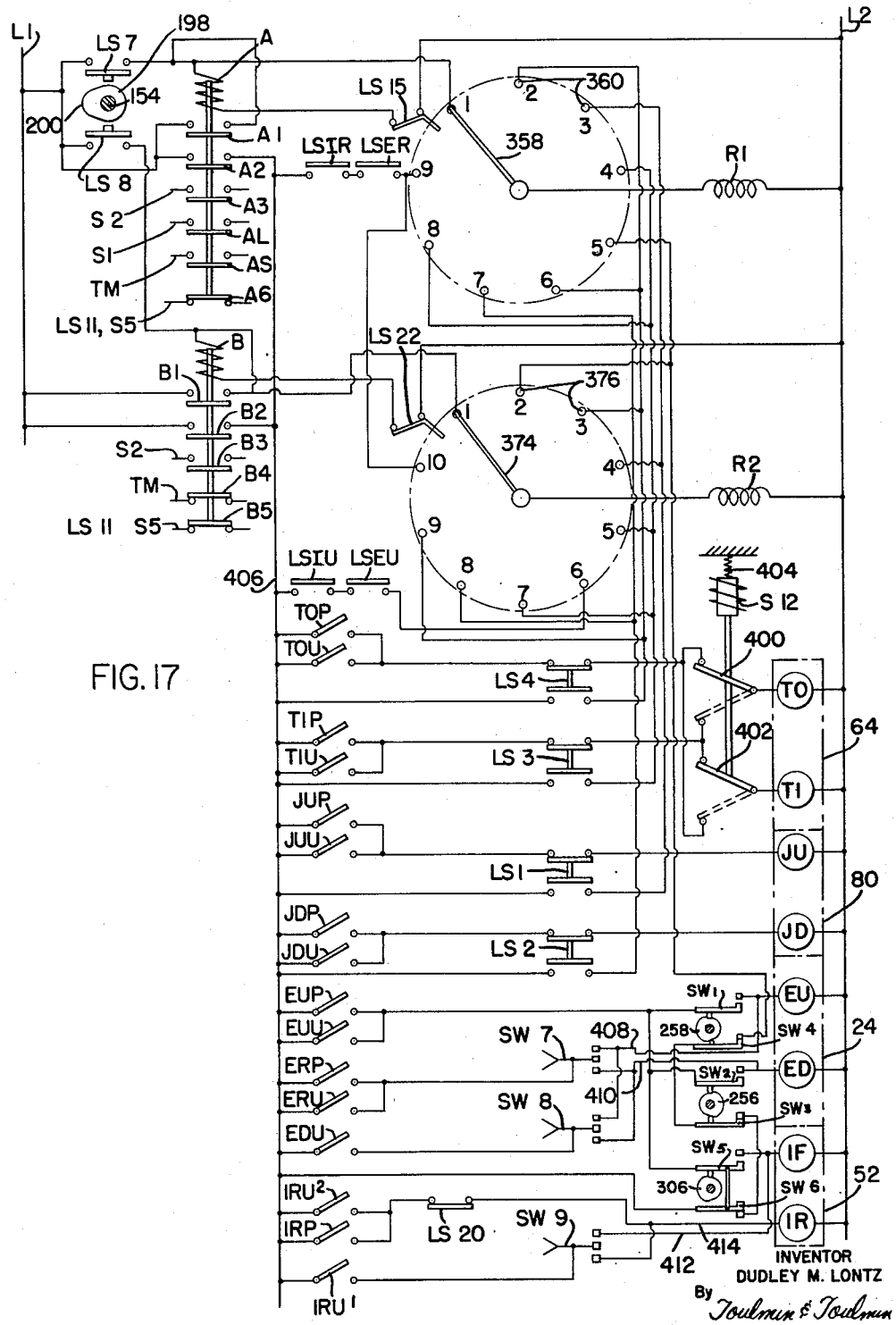
Figure 17 is a diagrammatic layout of the electric control circuit which is controlled by the key operated elements and which in turn controls the elevator and the turntable thereon in either parking or unparking operations.

The control system for controlling the elevator hoist motor, the turntable indexing motor, the truck motor, and the jack motor, is shown in Figure 17. A control switch used in this system is shown in Figure 18, and two cycle shafts and their associated cams and switches forming a part of the control system of Figure 17 are illustrated in Figures 19 and 20.

In order more easily to illustrate and describe the various switches in the system and the control elements connected therewith, the following nomenclature is employed:

Movement of the elevator from the loading level to the parking level will be called "elevator up movement" and will be indicated as EU.

Movement of the elevator from the parking level to the unloading level will be called "elevator down movement" and will be indicated as ED.

Movement of the elevator back to the loading level from any position will be referred to as "elevator return movement" and indicated as ER.

Movement of the truck outwardly from the turntable will be called "truck out movement" and indicated as TO.

Movement of the truck onto the turntable will be called "truck in movement" and indicated as TI.

Movement of the jack upwardly to lift the load to be moved onto the elevator will be called "jack up movement" and indicated as JU.

Similarly, lowering movement of the jack will be referred to as "jack down movement" and indicated as JD.

The movement of the turntable away from the position which it occupies for receiving cars at the loading level will be referred to as "index forward movement" and indicated as IF.

Similarly, movement in the opposite direction of the turntable will be referred to as "index reverse movement" and indicated as IR.

The switches identified according to the above schedule which pertain to the parking cycle will have the letter "P" attached, and those pertaining to the unparking cycle will have the letter "U" appended.

The several circuit elements in Figure 17 relating to the functions referred to above are marked according to the foregoing schedule, and it will be understood that these elements could be the actuating motors employed in the system or could be controls through which the said motors were operated. In either case, energization of any of the circuit elements results in energization of the corresponding motor for operation in the direction indicated. Similarly, de-energization of the circuit elements is accompanied by de-energization of the associated motor.

The switches in Figure 17 for controlling the circuit elements are arranged to be actuated by the cycle shafts shown in Figures 19 and 20. The cycle shaft in Figure 19 bears reference numeral 350, and mounted thereon are a plurality of cams associated with which are the switches shown in Figure 17 and the control switches 294 and 318 referred to in connection with Figures 15 and 16. Shaft 350 has nine operative positions corresponding to the nine contacts 360 arranged in a circular pattern adapted for being swept by a contact arm 358, and to this end mounts a nine-tooth ratchet wheel 352 having detent roller 354, and ratchet pawl 356. The ratchet pawl advances the ratchet wheel and, therefore, the cycle shaft one ninth of a revolution each time the ratchet solenoid R1 is energized. For each such operative position of shaft 350, except for its Figure 19 position, certain of the switches associated therewith are closed, while certain others are open.

As will be seen in connection with Figure 17, contact arm 358 is connected in series with the ratcheting relay R1, while contacts 360 are connected in series with limit switches controlled by the various elements of the storage system of this invention as they reach certain positions in carrying out a storage cycle.

The unparking cycle shaft is shown in Figure 20, and is identified by reference numeral 362. Similarly to shaft 350, shaft 362 carries a plurality of cams with which are associated another group of switches from Figure 17. Also associated with shaft 362 are a pair of cams for controlling switches 296 and 316 referred to in connection with Figures 15 and 16. Shaft 362 also has still another cam 364 for controlling a switch 366 connected with a solenoid S12, which will be referred to in connection with Figure 17.

Shaft 362 has ten operative positions and mounts a ten-tooth ratchet wheel 368 having a detent 370 and a pawl 372, the latter being adapted for actuation by a relay solenoid R2 for advancing ratchet wheel 368 and shaft 362 an angular distance of one tooth space each time R2 is energized. Shaft 362 also carries a rotary contact arm 374 which sweeps over a bank of contacts 376 and engages one thereof in each operative position of shaft 362. Contact arm 374 is connected in series with R2, and contacts 376 are connected in series with limit switches adapted for being closed by the elements of the storage system as they reach predetermined positions during an unparking cycle.

Referring to Figure 18, there is shown therein a switch which is employed in connection with the circuit of Figure 17. The switch comprises a body 378 in which is mounted a pair of spaced stationary contacts 380. Between the contacts 380 is a movable switch arm 382 adapted for contacting one or the other of contacts 380 or for being positioned in spaced relationship with both thereof.

Mounted on the body 378 is an actuating member 384 which holds arm 382 in its intermediate position when in the position shown and causes the arm to move into engagement with one or the other of contacts 380 when it is moved from the position shown. A spring pressed detent 386 assists in determining the three positions of member 384. Member 384 is notched, as at 388, and an operating dog 390 is adapted for engagement with the said notch.

When the element on which 390 is mounted moves relative to the switch in one direction, member 384 is indexed about 45 degrees counterclockwise to one of its contact making positions, and, as the said element moves relative to the switch in the opposite direction, the said member is indexed 45 degrees into its other contact making position. At any time the said element returns dog 390 to the position shown, member 384 is again snapped into its Figure 18 position.

In Figure 17, the switches which correspond in construction to the one described above are indicated at SW7, SW8 and SW9, and there is one at the loading level of the elevator, one at the unloading level of the elevator, and one at the unloading position of the turntable.

Referring now to Figure 17, the electrical control system will be explained. The power lines are indicated at L1 and L2. At the right side of the view it will be seen that connected with L2 are R1, R2, TO, T1, JU, JD, EU, ED, IF and IR. In series with R1, as mentioned in connection with the description of Figure 19, is the rotary contact arm 358 which sweeps over contacts 360. For convenience, the contacts are numbered from 1 to 9 in the direction of movement of arm 358 and will be referred to hereafter by position number. The contact 360 on which arm 358 rests in Figure 17 occupies what will be referred to as position 1 and is connected with one end of relay solenoid A. This same end of solenoid A is connected through control switch LS7 with power line L1. Normally open blade A1 of the relay provides a holding circuit for solenoid A which by-passes switch LS7.

The other end of solenoid A is connected through a limit switch LS15 with power line L2. It will be evident that closing of switch LS7 by rotation of one of the key shafts will bring about energization of solenoid A, which will thereafter remain energized through its holding blade A1 until switch LS15 is opened to interrupt the energizing circuit.

Simultaneously with the energization of A, R1 is energized through arm 358 and brings about an indexing movement of cycle shaft 350. This will rotate cycle shaft 350 to bring contact arm 358 into position 2 on the bank of contacts 360.

Referring now to the other circuit elements shown in Figure 17, TO is connected with blade 400 of a switch having a second blade 402 and normally biased into the position shown by spring 404. Solenoid S12, referred to in connection with switch 366 of cycle shaft 362, is energizable for shifting blades 400 and 402 into the dotted line positions shown. This switch is only operative during an unparking cycle and will be more specifically referred to hereinafter.

Blade 400 when in its upper position connects TO in series with the normally closed limit switch LS4 associated with cam 90 on shaft 88 (Figure 5), and the normally open switches TOP and TOU which are controlled by the cycle shafts 350 and 362. Switch LS4 in addition to its normally closed blade, has a normally open blade adapted for completing a circuit from a wire 406 to contacts 360 in the second and sixth positions and contacts 376 in the third and ninth positions. Wire 406, it will be noted, is adapted for being connected with power line L1 by blade A2 of contactor A when the solenoid thereof is energized.

Blade 402 similarly connects T1 in series with the normally closed blade of limit switch LS3 associated with cam 90 (Figure 5) and the switches TIP and TIU, which are controlled by cycle shafts 350 and 362. Switch LS3 also has a normally open blade adapted for completing a circuit from wire 406 to contacts 360 in positions 4 and 8 and to contacts 376 in positions 5 and 7.

JU is connected through the normally closed blade of limit switch LS1 with the switches JUP and JUU that are controlled by the cycle shafts. A normally open blade of LS1 is adapted for completing a circuit between wire 406 and contact 360 in position 3 and contact 376 in position 4.

JD is similarly connected through the normally closed blade of limit switch LS2 with switches JDP and JDU of the cycle shafts. The normally open blade of LS2 is adapted for connecting wire 406 with the contact 360 in position 7 and the contact 376 in position 8.

EU is connected through switch SW1 with the switches EUP and EUU of the cycle shafts, and ED is similarly connected through SW2 with the same cycle switches. The same cycle switches can be employed in connection with EU and ED because cams 256 and 258 determine which of switches SW1 and SW2 will be closed, and, since only one of these switches can be closed at any one time, it will be evident that only one of EU and ED can be energized by the closing of one of switches EUP or EUU.

EU and ED are also connected, as by wires 408 and 410, with the stationary contacts of a pair of switches SW7 and SW8 correspondnig to the switch construction shown in Figure 18. The movable contact of switch SW7 is connected with the cycle switches ERP and ERU, while the movable contact of switch SW8 is connected with cycle switch EDU. Switch SW7 is positioned at the loading level of the elevator and occupies one or the other of its contact making positions as determined by whether the elevator is above or below this level. Thus, any time it is desired to return the elevator to the loading level, closure of either of switches ERP or ERU will accomplish this through switch SW7. Also, when the elevator reaches the loading level, it will open switch SW7.

IR is connecetd in series with a limit switch LS20 and the parallelly connected cycle switches IRU2 and IRP. IF and IR are also connected by wires 412 and 414 with the two stationary contacts of a switch SW9 constructed like the switch shown in Figure 18. The movable contact of switch SW9 is connected with cycle switch IRU1. Switch SW9 is positioned so that it is opened by the turntable when the said turntable reaches its unloading position.

Thus, when a car is on the turntable and it is desired to rotate the turntable to the proper angular position for unparking the car, it is only necessary to close cycle switch IRU1. At that time switch SW9 will determine whether the turntable turns in one direction or the other. This movement will continue until SW9 is opened, this occurring when the turntable has reached the proper position. Limit switch LS20 is positioned to be opened by the turntable when it reaches proper position for receiving cars at the parking level.

Connected between wire 406 and contact 376 in the 6th position are a pair of limit switches LSEU and LSIU. These limit switches are positioned to be closed by the elevator and turntable when both are in proper position for the unparking of car. Similarly connected between wire 406 and contact 360 in position 9 and contact 376 in position 9 and contact 376 in position 10, are another pair of serially arranged normally open limit switches LSER and LSIR which are positioned to be closed by the elevator and turntable when positioned for receiving the car to be parked at the loading level.

As will be seen in Figure 17, relay A has a number of blades thereon in addition to blade A1 and blade A2, which are identified as A3, A4, A5 and A6. These blades perform, respectively, the following functions.

A3 is aranged in series with solenoid S2 which closes the inlet to the coin chute so that when a parking cycle is initiated, the coin chute is closed and thereafter remains closed until the cycle then being carried out is completed. This will be seen in Figures 8 and 9.

As will also be seen in Figures 8 and 9, A4 is serially arranged with solenoid S1 which is arranged to release the coins from the coin chute. Initiating of a parking cycle, therefore, operates to drop the coins from the coin chute into a receiving bin. A5 is in series with timer TM (Figure 11) and energizes the timer when A is energized. Blade A6 is normally closed and is in series with S5 and LS11 (Figure 11) so that whenever a parking cycle is in progress LS11 is without effect for energizing S5 to unlock the key shafts.

Turning now to the unparking relay, this is indicated at B, and it will be seen that one end of the actuating solenoid of relay B is connected with line L1 through control switch LS8 adapted for being closed by cam 198 when the key shaft is turned for unparking a car. The other end of solenoid B is connected through a limit switch LS22 with line L2. Relay B has a holding blade B1 by-passing switch LS8, and the end of solenoid B adjacent line L1 is connected with contact 376 in position 1.

Another blade B2 is adapted for connecting wire 406 with line L1 upon energization of relay B. Relay B also includes the other normally open blade B3 and the normally closed blades B4 and B5. These last mentioned blades are operable for respectively performing the following functions:

Blade B3 is arranged in parallel with blade A3 and controls the coin chute locking solenoid S2 in the same manner as blade A3 so that the coin chute is locked during the carrying out of an unparking cycle. Blade B4 is normally closed and is arranged in series with timing motor TM (Figure 11) so that opening of blade B4 by energization of relay B will interrupt the circuit to the timing motor and cause it to stop operating. At this time, the timing motor resets itself to the position shown in Figure 10 and is ready for operation when an automobile is again parked in the storage space to which it pertains.

Blade B5 is normally closed, but whenever relay B is energized, B5 is open and prevents energization of S5 by LS11, as will be seen in Figure 9.

Turning for the moment to switches LS15 and LS22, it will be observed that these are positioned to be engaged and opened by contacts 358 and 374 as the said contacts move from their last to their first position. The said limit switches are provided for the purpose of de-energizing the relays A and B at the completion of the cycles to which they appertain.

OPERATION

Parking

In order more fully to understand the nature and operation of the instant invention, a typical parking and unparking cycle will now be described.

The car to be parked is driven into proper position at the parking level of the garage in alignment with driveway 40. The car driver then places the required number of coins of the proper denomination in the coin chute 104. These coins cause plate 110 to pivot about pivot 112 against spring 114 and close limit switch LS5. This completes a circuit through solenoid S5 which turns cam 178 so as to shift levers 176, links 174 and bell cranks 168 and 170, thereby releasing the ball locking system for the several key shafts in the key panel. Switch LS5 also closes a circuit through S2, and this actuates bell crank 118 to move plunger 120 across the opening in the coin chute, thereby to prevent any more coins from being placed therein.

The car operator can now turn any one of the keys in the key panel. Let it be assumed, for example, that he has turned the key corresponding with the fourth story of the storage upwardly from the parking level and the fourth station on that floor from the station the turntable occupies at the loading level.

When the key shaft is turned, the cam 202 thereon will cause impulse switch LS9 to close and open four times in succession. This will bring about four energizing impulses to solenoid S8 which will cause pawl 260 carried thereby to index ratchet wheel 254 clockwise an angular distance equal to four tooth spaces. Ratchet wheel 254 turns shaft 250, and this also turns cams 256 and 258. Turning of these cams will bring about closing of switch SW1 and opening of switch SW3. If, on the other hand, the floor on which the car was to be parked had been below the loading level, solenoid S9 would have received the impulses from switch LS9 and the ratchet wheel and shaft would have been indexed counterclockwise, and switch SW2 would have been closed and switch SW4 opened. Still another case would occur when the parking station was on the same level as the loading station, in which case the ratchet wheel and shaft would not move and switches SW1 and SW2 would remain open and switches SW3 and SW4 would remain closed.

As the key shaft is turned the other of cams 202 will cause impulse switch LS10 to be successively closed four times, and this will bring about a series of four energizing impulses to ratcheting solenoid S10 associated with ratchet wheel 304 on shaft 300. This will bring about corresponding indexing of the said ratchet wheel and shaft an angular distance equal to four tooth spaces on the ratchet wheel and thus move cam 306 so as to close switch SW5 and open switch SW6.

As the key shaft is rotated, cam 198 engages and closes control switch LS7 and this brings about energization of the actuating solenoid of relay A, as previously described. Energizing of A will close blade A1 thereof to provide a holding circuit for the relay, will close blade A2 to connect line 406 with power line L1, will close blade A3 to energize S2, will close A4 to energize S1, will close blade A5 to energize TM, and will open blade A6 to make the locking system again effective.

Referring to the timing motor TM, a blade T1 thereof by-passes A5 and provides a holding circuit for the timing motor. The timing motor will continue to run until the vehicle in the storage space pertaining to that timing motor is removed therefrom.

At this time, the key shaft has been rotated one half revolution, the coins have been dropped from the coin chute, the plunger 120 is blocking the coin chute, the system of key shafts is again locked, and relay A is energized.

As referred to previously, energization of relay A will immediately cause an indexing movement of shaft 350. When shaft 350 is indexed and has brought arm 358 into position 2, the said shaft will remain stationary until R1 is again energized by the actuation of limit switch LS4. In position 2, the first cam on shaft 350 closes switch TOP, and this energizes TO to move the truck outwardly beneath the car which is to be parked. When the truck reaches its outermost position, at which time it is properly located beneath the car, limit switch LS4 is engaged and opened by cam 90. This will de-energize TO and simultaneously deliver an energizing impulse to ratcheting relay R1 via contact 2 of contacts 360 and contact arm 358. This impulse to ratcheting relay R1 will cause control shaft 350 to be indexed to its next operative position, and in which position JUP is closed and TOP is open.

Closure of JUP will energize JU and elevate the platform of the truck into engagement with the car. When the lifting movement of the platform is completed, limit switch LS1 is engaged and actuated by crank 76, and this brings about de-energization of JU and another energizing impulse to R1, which brings about another indexing movement of shaft 350.

The last-mentioned indexing movement of shaft 350 closes switch TIP, and this brings about energization of TI so that the truck and the vehicle which is engaged thereby move onto the elevator. When inward movement of the truck and the vehicle which it engages is completed, switch LS3 is engaged and opened. TI is thereby de-energized, and another impulse is delivered to ratcheting solenoid R1.

The impulse delivered to solenoid R1, referred to above, again indexes shaft 350 to close switch EUP. Closure of EUP connects wire 406 with one end of each of the switches SW1, SW2, and SW5. Inasmuch as switch SW1 has previously been closed due to the aforementioned indexing in a clockwise direction of cam 258, EU is energized. Also, switch SW5 also has previously been closed due to the aforementioned clockwise indexing of cam 306. Accordingly, both EU and IF are energized and the elevator moves upwardly from the loading level, and the turntable commences rotation toward the unloading position. As the elevator moves upwardly from the loading level, limit switch LS13 is successively energized by cams 292, and, as explained before, this brings about successive impulses to solenoid S9, thereby to effect a step by step movement of ratchet wheel 254, shaft 250, and cam 258 in a counterclockwise direction. Cam 258 having been indexed four teeth clockwise by the turning of the key shaft, the elevator will move upwardly to the fourth floor, at which time cam 258 has been returned to its Figure 15 position, and switch SW1 is opened to de-energize EU, thus stopping the elevator at the proper level.

During movement of the elevator, IF is energized, as stated above, and causes rotation of the turntable, and as the turntable rotates, switch LS14 is successively engaged and actuated by cams 320. When switch LS14 has been actuated the same number of times that there were impulses delivered to solenoid S10 by turning of the key shaft, cam 306 is again in its Figure 16 position and switch SW5 is opened and de-energizes the turntable drive motor. Inasmuch as the turntable movement and elevator movement can occur simultaneously, no separate energizing circuits are required for the elevator and turntable, and both are, therefore, controlled by a single control switch.

When the elevator has reached its designated floor and the turntable has reached its designated station, cams 306, 256, and 258 occupy their Figures 15 and 16 positions, and permit closing of switches SW3, SW4 and SW6. These last-mentioned switches are connected in series between wire 406 and contact 360 in position 5, so that another energizing impulse is delivered to solenoid R1, thus bringing about another indexing movement of shaft 350. This movement of shaft 350 closes TOP again, and the truck moves outwardly from the elevator carrying with it the vehicle into its storage compartment.

The truck will move outwardly from the elevator until switch SW4 is again actuated by cam 90, which brings about halting of the truck out movement, and another indexing movement of shaft 350.

The last-mentioned indexing movement of shaft 350 closes JDP which energizes JD and brings about a lowering movement of the platform of the truck. When the platform reaches its lowermost position, crank 76 engages limit switch LS2. This de-energizes JD and also brings about another indexing movement of shaft 350.

This indexing movement of shaft 350 closes TIP, which again energizes TI and returns the truck to the elevator. The truck in movement continues until limit switch LS3 is engaged by cam 90, at which time TI is de-energized and shaft 350 is indexed to its next operative position. In this last-mentioned position of shaft 350, switches ERP and IRP are closed, switch ERP being connected with the center contact member of switch SW7, and switch IRP connected with IR. Closure of these switches thus brings about energization of the elevator in a direction to return to the loading level of the system as determined by the position of SW7, and energization of IR to return the turntable to its loading position. Movement of the elevator will continue until switch SW7 is opened thereby, and at which time elevator hoist motor will be de-energized. Movement of the turntable will continue until it opens switch LS20, at which time its drive motor will be de-energized, and the turntable will stop.

When both the elevator and the turntable are properly positioned at their loading stations, LSER and LSIR are closed, and this delivers a final energizing impulse to solenoid R1 which brings about a final indexing movement of shaft 350 back to its Figure 19 position. During this last indexing movement of shaft 350, limit switch LS15 is engaged and opened, as by arm 358, and this brings about a de-energization of the actuating solenoid of relay A, thereby clearing the entire circuit and leaving the system in condition for institution of a new cycle of operation.

In connection with the movement of the elevator and turntable during a parking cycle, means are provided whereby the switches LS13 for the elevator and LS14 for the turntable are effective only during the initial movement of the said elevator and turntable away from their loading position and toward their designated unloading positions. This is accomplished by the switches 294 and 318, which are closed only when shaft 350 is in position for closing EUP and which switches are connected in series with limit switches LS13 and LS14, respectively.

It is to be noted that while de-energization of relay A clears the entire circuit for a new cycle of operation to be initiated, timer TM remains energized through its holding blade T1 and will continue to be energized until the key shaft pertaining to the space in which the vehicle was first parked is again turned.

*Unparking*

To complete the description of a complete cycle of operation, the unparking of the vehicle which was parked in the manner described above will now be taken up.

When it is desired to unpark the vehicle, the key pertaining to the space in which it is parked is again inserted in the proper lock, and the key shaft turned in the same direction as it was turned before. For an unparking cycle, it is not necessary to deposit coins, and, therefore, another means must be provided for unlocking the locking system. This has been referred to previously and consists of positioning switch LS11 and lobe 214 of cam 216 such that the said switch will be closed by the taking up of the clearance in the ball system. Closing of switch LS11 energizes S6, which moves member 220 into engagement with the notch in the periphery of member 218, and, thereby, urges associated shaft 154 in the proper direction.

Closing of LS11 also energizes S5 which brings about releasing of the balls so that member 220 and solenoid S6 are effective for rotating shaft 154. As rotation of shaft 154 is continued in this manner, control switch LS8 is engaged and closed by lobe 200 on cam 198. Closure of LS8 completes a circuit through the actuating solenoid of relay B and limit switch LS22 so that relay B closes. Closure of B closes blade B1 thereof to provide a holding circuit which will maintain B energized until switch LS22 is opened, as will be described hereinafter.

Energization of B also closes blade B2 which connects wire 406 with line L1. Blade B3 of the relay, and which is in parallel with the blade A3 of relay A, is also closed, and this is effective for energizing S2 to block the coin chute, thereby to prevent the insertion of any coins therein. Normally closed blades B4 and B5 are opened by energization of B and opening of B4 is effective for deenergizing timing motor TM which will thereupon reset to its starting position. Opening of B5 makes LS11 and S5 ineffective for unlocking the ball system until the unparking cycle being instituted is completed.

During rotation of shaft 154 in its movement to initiate an unparking cycle and prior to closing of LS7, LS6 is engaged and closed by the lobe of cam 215. Closure of LS6 completes a circuit through rotary contact 142 and the contacts in the bank over which its sweeps to certain ones of solenoids S3. This brings about ejection of coins from the coin tubes 126 into the coin return chute 138 and thence to the cup 106. As explained before, the number of coins returned in this manner is determined by the elapsed time that the vehicle has been parked in the system and which elapsed time is measured by timer TM that commenced to run when the parking cycle for the vehicle was initiated. If the vehicle has been left parked overtime, the solenoid S4 is energized, as previously explained, and locks shaft 154 against rotation so that in order to retrieve the car, the individual attempting to unpark it must call the attendant, who will collect the necessary fee and then unlock the key shaft so the car can be unparked by opening switch 152.

When the key shaft is rotated for initiating an unparking cycle, the cams 202 thereon actuate impulse switches LS9 and LS10 in the same manner as these switches were actuated at the initiation of the parking cycle, and this results in clockwise indexing of the shafts 250 and 300 an angular distance of four tooth spaces on their associated ratchet wheels. This operation of the determining mechanisms determines the floor and station at which the elevator and turntable will proceed for retrieving the car from storage.

Simultaneously with the energization of the actuating solenoid of relay B, an energizing impulse is delivered to ratcheting solenoid R2 through contact arm 374 and contact 376 in position 1. This results in indexing movement of shaft 362 to close switch EUU. Reference to Figure 17 will show that switch EUU is in parallel with switch EUP and that, accordingly, the elevator and turntable will proceed to their designated positions, as explained in connection with the parking cycle.

The elevator and turntable having reached these designated positions, cams 256, 258 and 306 will again occupy their Figures 15 and 16 positions and switches SW3, SW4 and SW6 will all be closed, and another energizing impulse will be delivered to solenoid R2. This results in another indexing movement of shaft 362 which closes switch TOU. At this time the truck moves outwardly off the elevator to beneath the car until switch LS4 is actuated, and at which time shaft 362 indexes again and closes JUU.

This causes elevation of the truck platform until switch LS1 is actuated, bringing about another indexing movement of shaft 362 which closes switch TIU. Closure of TIU energizes TI, and the truck moves inwardly carrying with it the vehicle to be unparked. The truck moves inwardly until it engages switch LS3, thereby bringing about another indexing movement of shaft 362 which closes switches EDU and IRU1. Closing of EDU completes a circuit from wire 406 to the movable contact of switch SW8, the two fixed contacts of which are connected with EU and ED. As mentioned previously, switch SW8 is positioned at the unloading level of the elevator and occupies one of its contact making positions when the elevator is above that level and the other of such positions when the elevator is below that level and is open when the elevator is at that level. Accordingly, closing of EDU causes the elevator to move toward the unloading level, and this movement of the elevator continues until it reaches the unloading level and opens switch SW8.

Switch IRU1 is connected with the movable contact of switch SW9 positioned so that it is open when the turntable is at its unloading position, occupies one operative contact-making position when the turntable is clockwise from its unloading position, and a second operative position when the turntable is counterclockwise from its unloading position.

Closure of IRU1, accordingly, energizes the turntable drive to move the turntable toward its unloading position, and in which position SW9 is opened and the turntable stops.

When the elevator and turntable are both in their proper unloading positions, limit switches LSEU and LSIU are closed, and an energizing current is delivered to solenoid R2 which again brings about an indexing movement of shaft 362. Associated with shaft 362 is the cam 364 that controls switch 366 associated with solenoid S12.

Prior to the last-mentioned indexing movement of shaft 362, switch 366 is closed by its cam to energize S12. Energization of S12 shifts switch arms 400 and 402 to their dotted line position, and in which position the connections to TO and TI are interchanged. This exchange of connections interchanges the functions of LS3 and LS4, so that when TI is energized, the truck will move outwardly from the elevator opposite to the direction which it took when moving outwardly to engage the parked car.

Closure of TIU, as mentioned above, accordingly, energizes TI and the truck moves out of the elevator carrying with it the vehicle being unparked front and foremost. This movement of TI continues until LS4 is engaged by cam 99. At this time shaft 362 is again indexed to its next operative position, and switch JDU is closed to bring about lowering movement of the truck platform, and this continues until switch LS2 is actuated, which brings about another indexing movement of shaft 362. This last indexing movement of shaft 362 closes switch TOU, which energizes the truck to return to its position on the turntable. After the truck has reached its central position on the turntable, switch LS3 is engaged and brings about another indexing movement of shaft 362. This last indexing movement of shaft 362 closes switches ERU and IRU2.

Switch ERU is connected with the movable element of switch SW7, as was ERP during the parking cycle, and in the same manner as already explained in connection with ERP, causes the elevator to return and stop at the unloading level. IRU2 is connected in parallel with IRP, referred to in connection with the parking cycle, and in the same manner as IRP, causes the turntable to return to its loading position, at which time the turntable opens switch LS20 and stops.

When the elevator and turntable are both properly positioned at their loading stations, limit switches LSER and LSIR, referred to in connection with the parking cycle, are both closed, and a final energizing impulse is delivered to solenoid R2, which brings about a final indexing movement of shaft 362 back to its starting position.

During the final indexing movement of shaft 362, switch LS22 is engaged and opened, as by arm 374, and interrupts the energizing circuit for relay B, thereby dropping this relay out and clearing the entire circuit for the initiation of a new cycle of operation.

As was the case during the parking cycle, previously described, limit switches LS12, LS13 and LS14 are only effective during an unparking cycle while the elevator and turntable are moving from the loading level and position to their designated level and position by virtue of control switches 296 and 316 which are connected in parallel with switches 294 and 318 and which are closed only while shaft 362 is resting in position for holding switch EUU closed. During the remainder of the unparking cycle, switches 296 and 316 remain open and limit switches LS12, LS13, and LS14 are, accordingly, ineffective.

In Figure 21 there is shown a plan view of a modified arrangement wherein multiple parking units according to my invention are arranged so as to provide the maximum of storage space for a minimum amount of ground area. In Figure 21 there are three parking units 400, 402, and 404, each of which may be substantially identical with the one hereinabove described. Separate entrances are provided for these units, as at 406, 408 and 410. Separate exits 412, 414, and 416, are also provided, and, preferably, both entrances and exits are connected with common roadways, as at 418 and 420.

In Figure 22 there is illustrated one of the preferred adaptations of my invention to existing parking lots. In Figure 22 the spaces in which the cars are to be parked are indicated at 450, and between adjacent rows of parking spaces are the aisleways 452 having the tracks or guide means 454. Along each aisleway, there is mova- the carriage mechanism 456. This is guided alongthe aisleway by the track means 454. Each carriage 456 mounts a truck 458, similar in construction to the truck which was described in the modification set forth in detail above.

The cars to be parked are driven onto the ramps or spaces indicated at 460, and when positioned thereon may be engaged by the trucks 458 which are movable to and from their carriages 456 in a manner similar to that described in connection with the truck of the previous modification. After the trucks have moved the cars to be parked onto the carriage, the carriage will move down the aisle to a designated position, and thereafter the truck will move the car from the carriage in one direction or the other into an adjacent parking space.

It will be evident that the operation of the carriages and trucks in Figure 22 can be accomplished by a key operated control panel of the same type as has previously been described in detail. Also, the carriages and trucks in Figure 22 could be controlled by an operator at a central station by means of a manually operated control panel, and definite benefits in connection with the saving of labor and protection of the cars being parked from harm would obtain.

Figure 22 shows an arrangement somewhat similar to another contemplated use of this invention wherein, instead of the storage areas or compartments being arranged on a single level, they are arranged in vertical tiers on opposite sides of service aisles, and which aisles may be independent or which may be connected with main aisles. The conveyor mechanism for conveying the loads to and from the loading and unloading stations could likewise be arranged in multiple, each servicing a predetermined number of aisles, or a single conveyor mechanism could be employed for servicing the entire storage system. It will be evident that in an arrangement of this nature it would be necessary to provide for more coordinate determining instrumentalities than were necessary in connection with the parking garage described in detail. However, as stated before, this invention contemplates operating as many of these instrumentalities as is necessary to determine the location of the storage compartments.

The conveyor mechanism hereinbefore described is characterized by a platform which elevates to engage the load to be moved, and while such a mechanism would have wide utility for use with cars, skid platforms, and other similar loads, it is not intended for this invention to be limited in scope to the particular conveyor mechanism illustrated and described.

For example, in the case of an installation having tiers of compartments on opposite sides of service aisles and a main aisle connecting the service aisles, the conveyor mechanism would take a substantially different form, while still retaining the elements of this invention.

In such a case, the conveyor mechanism would be adapted for proceeding to a certain point along the main aisle, then moving laterally along one of the service aisles to a predetermined point, then vertically to a predetermined level, and then either forwardly or backwardly to carry its load into an adjacent storage compartment or to remove a load therefrom. It will be evident that this cycle of operations is substantially the same as has been described in connection with the turntable and truck of the parking garage but that certain modifications would necessarily have to be made in its construction in order to adapt it to a work cycle of this nature.

It will be understood that this invention is susceptible to modification in order to adapt it to different usages and conditions, and, accordingly, it is desired to comprehend such modifications within this invention as may fall within the scope of the appended claims.

I claim:

1. In a storage system having a plurality of serially arranged storage compartments and a loading station; a conveyor movable between said station and compartments, said conveyor including means for engaging loads in said loading station and depositing the loads in said compartments, actuating means energizable for moving said conveyor, control means for controlling the energization of said actuating means and having a plurality of conveyor energized positions, one for each said compartment, and a single conveyor de-energized position, means for initially positioning said control means in one of its conveyor energized positions and for then establishing an energizing circuit for said actuating means, means operable by movement of said conveyor past the compartments intervening between the loading station and the selected one of said compartments corresponding to the said one position of said control means for returning the control means step by step to its conveyor de-energized position, and a cycle controller operable to cause said conveyor first to engage a load in said loading station, then to move under the influence of said actuating means into the said one compartment, then to deposit the load in the said compartment, and, lastly, to return to said loading station, all during a single integrated cycle.

2. In a storage system comprising a plurality of serially arranged storage compartments and loading and exit station means and a conveyor normally positioned adjacent said loading station means and movable between said station means and said compartments to convey loads therebetween, said conveyor including a member movable between load engaging and load releasing positions; control means for said conveyor having a plurality of serially arranged conveyor energized positions and a conveyor de-energized position, a selector shaft for each compartment associated with said control means operable to place said control means in the conveyor energized position corresponding to the pertaining compartment, means interlocking said shafts so only one thereof can be actuated at one time, means responsive to movement of said conveyor into operative alignment with the one of said compartments corresponding to the actuated one of said shafts for returning said control means to conveyor de-energized position, and a cycle controller operable in response to the actuation of any one of said shafts and effective for first moving said member into load engaging position, for then energizing said conveyor through said controller means, for then, after said conveyor has halted in alignment with the selected one of said compartments, moving said member into load releasing position, and, finally, for returning said conveyor to its starting position.

3. In a storage system having a plurality of compartments for receiving loads to be stored and a conveyor movable along said compartments for conveying the loads to and from said compartments; first control means operable to cause said conveyor to engage a load and convey it to and deposit it in a selected one of said compartments, second control means operable to cause said conveyor to engage and remove a load from a compartment and convey it therefrom, a control shaft for each compartment having a first rotated position wherein said first control means is effective for causing the depositing of a load in the associated compartment and a second rotated position wherein said second control means is effective for causing the removal of a load from the said associated compartment, ratchet means for the shafts for permitting rotation thereof in only one direction whereby the control means retaining thereto are alternately effective, means interlocking said shafts so only one thereof can be operated at one time, means normally locking said interlocking means to prevent movement of any of said shafts, means for momentarily releasing the said means normally locking said interlocking means to permit movement of one only of said shafts, and means operable upon movement of any of said shafts from one position thereof to halt the said shaft in its other position.

4. In a storage system having a plurality of compartments for receiving loads to be stored and a conveyor movable along said compartments for conveying the loads to and from said compartments; first control means operable to cause said conveyor to engage a load and convey it to and deposit it in a selected one of said compartments, second control means operable to cause said conveyor to engage and remove a load from a compartment and convey it therefrom, a control shaft for each compartment having a first position of rotation wherein said first control means is effective for causing the depositing of a load in the associated compartment and a second position of rotation wherein said second control means is effective for causing the removal of a load from the said associated compartment, ratchet means for the shafts permitting rotation thereof in only one direction whereby the control means pertaining thereto are alternately effective, means interlocking said shafts so only one thereof can be operated at one time, means operable upon movement of any of the control shafts from one position to halt the said shaft in its other position, and means operable automatically during the carrying out of a storing or unstoring cycle to prevent actuation of any of said shafts.

5. In a storage system having a plurality of compartments for receiving loads to be stored, an entrance station and an exit station, and a conveyor movable along the compartments between said stations for conveying the loads between said stations and said compartments; first control means operable to cause said conveyor to engage a load at said entrance station and convey it to and deposit it in a selected one of said compartments, second control means operable to cause said conveyor to engage and remove a load from a compartment and convey it therefrom and deposit it in said exit station, a control shaft corresponding to each said compartment and having two angularly spaced positions, movement of each shaft into one of its positions making said first control means effective for causing a load to be deposited in the compartment corresponding to said shaft, and movement of the shaft into its other position making said second control means effective for causing the removal of a load from the compartment corresponding to said shaft, means for permitting rotation of the shafts in only one direction whereby the control means pertaining thereto are alternately effective, a cam on each shaft, follower means bearing on said cams and extending between the cams operable to prevent actuation of more than one shaft at a time, and means operable automatically during the period of effectiveness of either of said control means to lock said follower means and thereby prevent the actuation of any of said shafts.

6. In a storage system; means forming an elevator shaft, a plurality of compartments arranged radially about said shaft at different levels, separate entrance and exit stations along said shaft, an elevator movable in said shaft between said stations along said compartments, a self-propelled truck on said elevator movable therefrom into said stations and compartments to remove loads therefrom or deposit loads therein; a first control means operable to cause said truck to move from said elevator and engage a load in said entrance station and to move the load onto said elevator, then to cause the elevator to move into alignment with one of said compartments, then to cause said truck to move the load into said compartment and deposit it therein and return to said elevator, and then to cause said elevator to return to said entrance station; a second control means operable to cause said elevator to move into alignment with one of said compartments, then to cause said truck to move from the elevator and engage a load in the said compartment and to move the load onto the elevator, then to cause said elevator to move to said exit station, then to cause said truck to move the load from said elevator into said exit station and deposit it therein and move back onto said elevator, then to cause said elevator to return to said entrance station; a control element for each compartment having a first position wherein said first control means is effective to cause the depositing of a load in the corresponding compartment, and a second position wherein said second control means is effective to cause the removal of a load from said compartment; means for selectively actuating any one of said elements from whichever of its positions it occupies to its other position, and means for postively locking all of said elements against movement during the conveying out of an operative cycle by said elevator and truck.

7. An arrangement as set forth in claim 1 which includes a turntable in the elevator supporting the said truck and rotatable for aligning the truck with any preselected compartment about the shaft.

References Cited in the file of this patent

UNITED STATES PATENTS

| Number | Name | Date |
|---|---|---|
| 1,369,094 | Gale | Feb. 22, 1921 |
| 1,370,111 | Jackson | Mar. 1, 1921 |
| 1,773,130 | Denniston | Aug. 19, 1930 |
| 1,780,380 | Durdin | Nov. 4, 1930 |
| 1,869,900 | Landenberger | Aug. 2, 1932 |
| 1,879,713 | Scott | Sept. 27, 1932 |
| 1,925,442 | Fournier | Sept. 5, 1933 |
| 1,931,071 | Halstead, Jr. | Oct. 17, 1933 |
| 1,966,165 | Clyde | July 10, 1934 |
| 2,009,536 | Warg | July 30, 1935 |
| 2,028,391 | Harnischfeger | Jan. 21, 1936 |
| 2,070,793 | Kent | Feb. 16, 1937 |
| 2,080,964 | Forstrom | May 18, 1937 |
| 2,120,751 | Jenney | June 14, 1938 |
| 2,184,101 | Obergfell | Dec. 19, 1939 |
| 2,204,023 | Mason | June 11, 1940 |
| 2,223,146 | Yeomans | Nov. 26, 1940 |
| 2,276,740 | Saito | Mar. 17, 1942 |
| 2,285,121 | Mason | June 2, 1942 |
| 2,337,130 | Rubel | Dec. 21, 1943 |
| 2,358,747 | Teetor | Sept. 19, 1944 |
| 2,459,906 | Weber | Jan. 25, 1949 |
| 2,479,153 | Buss | Aug. 16, 1949 |
| 2,567,018 | Grob | Sept. 4, 1951 |

FOREIGN PATENTS

| Number | Country | Date |
|---|---|---|
| 167,637 | Great Britain | Aug. 18, 1921 |
| 409,552 | Great Britain | May 3, 1934 |